(12) United States Patent
Moore

(10) Patent No.: US 10,339,681 B2
(45) Date of Patent: Jul. 2, 2019

(54) INTERACTIVE MULTIMEDIA PROCESS FLOW CHART BUILDER

(71) Applicant: Raytheon Company, Waltham, MA (US)

(72) Inventor: Erik M. Moore, McKinney, TX (US)

(73) Assignee: RAYTHEON COMPANY, Waltham, MA (US)

(*) Notice: Subject to any disclaimer, the term of this patent is extended or adjusted under 35 U.S.C. 154(b) by 1167 days.

(21) Appl. No.: 14/087,356

(22) Filed: Nov. 22, 2013

(65) Prior Publication Data

US 2016/0155249 A1   Jun. 2, 2016

(51) Int. Cl.
| G06F 17/00 | (2019.01) |
| G06T 11/20 | (2006.01) |
| G06F 3/0481 | (2013.01) |
| G06Q 10/00 | (2012.01) |
| G06F 8/34 | (2018.01) |

(52) U.S. Cl.
CPC ........ G06T 11/206 (2013.01); G06F 3/04817 (2013.01); G06F 8/34 (2013.01); G06Q 10/00 (2013.01); *G06T 2200/24* (2013.01)

(58) Field of Classification Search
CPC .................................................. G06F 3/04847
USPC .......................... 715/203, 204, 246, 810, 841
See application file for complete search history.

(56) References Cited

U.S. PATENT DOCUMENTS

| 5,870,552 A | 2/1999 | Dozier et al. |
| 5,877,766 A | 3/1999 | Bates et al. |
| 5,893,105 A | 4/1999 | MacLennan |
| 5,982,383 A | 11/1999 | Kumar et al. |
| 6,243,857 B1 | 6/2001 | Logan, III et al. |
| 6,820,067 B1 | 11/2004 | Hammond et al. |
| 7,873,651 B2 | 1/2011 | Ono et al. |
| 8,266,580 B2 | 9/2012 | Wang et al. |

(Continued)

FOREIGN PATENT DOCUMENTS

| EP | 0456378 | 11/1991 |
| EP | 0661631 | 7/1995 |
| EP | 2416283 | 2/2012 |

OTHER PUBLICATIONS

U.S. Appl. No. 14/087,303 Final Office Action dated Apr. 20, 2016 (RAY0245US), 14 pages.

(Continued)

*Primary Examiner* — Stephen S Hong
*Assistant Examiner* — Matthew J Ludwig
(74) *Attorney, Agent, or Firm* — Cantor Colburn LLP

(57) ABSTRACT

According to an aspect a method for building an interactive multimedia process flow chart is provided. The method includes displaying a process flow chart in an interactive graphically editable format on a user interface. The process flow chart includes a plurality of nodes each located entirely in a single node cell of a node grid. A pair of output hubs on a decision node of the process flow chart is linked to a pair of nodes defining a yes-path and a no-path. An output hub of a process step node of the process flow chart is linked to a single node defining a next process step. A link is established to an end node of the process flow chart absent any output links from the end node. The decision node, process step node, and end node each have a common shape including a display region and an editing command region.

20 Claims, 15 Drawing Sheets

(56) References Cited

U.S. PATENT DOCUMENTS

| | | | |
|---|---|---|---|
| 8,464,169 B2* | 6/2013 | Gottlieb | G06F 8/34 |
| | | | 715/763 |
| 9,037,974 B2* | 5/2015 | Waldman | G06F 17/211 |
| | | | 715/730 |
| 2002/0140731 A1* | 10/2002 | Subramaniam | G06F 3/0481 |
| | | | 715/762 |
| 2005/0289526 A1 | 12/2005 | Wang et al. | |
| 2007/0240046 A1* | 10/2007 | Yan | G06Q 10/06 |
| | | | 715/700 |
| 2008/0005122 A1 | 1/2008 | Grems et al. | |
| 2008/0065977 A1* | 3/2008 | Gottlieb | G06F 8/34 |
| | | | 715/203 |
| 2009/0276706 A1 | 11/2009 | Lukes | |
| 2010/0153852 A1* | 6/2010 | McCallum | G06Q 10/06 |
| | | | 715/736 |
| 2011/0134126 A1 | 6/2011 | Miyazaki | |
| 2012/0131557 A1 | 5/2012 | Davies | |

OTHER PUBLICATIONS

"CHARTS uncovered," Pragma Advanced Document Engineering, www.pragma-ade.com/general/manuals/mchart.pdf Retrieved from the internet: Oct. 21, 2013, 20 pages.

N. Hebb; "How to Set Up an Flowchart Drawing Grid in Excel," BreezeTree Software, http://www.breezetree.com/articles/flowcharting-grid.htm Retrieved from the internet: Sep. 20, 2013, 6 pages.

U.S. Appl. No. 14/087,303 NonFinal Office Action, dated Oct. 28, 2015, 18 pages (RAY0245US).

* cited by examiner

INTERACTIVE MULTIMEDIA PROCESS FLOW CHART BUILDER

GOVERNMENT RIGHTS

This invention was made with government support under contract numbers: W15P7T-08-D-5602-0001; FA8620-11-G-4050-0003; Z1TFSAAZ and N00164-12-G-JQ66-0012 awarded by the Department of Defense. The government has certain rights in the invention.

BACKGROUND

The present invention relates to process flow charts, and more specifically, to an interactive, multimedia process flow chart builder.

Process flow charts can be useful in a number of environments. As one example, in a manufacturing environment, a number of different issues can arise when assembling complex systems that include multiple subsystems. There can be dozens of potential failure modes associated with various subsystems. Upon identifying a failure, a technician must determine the root cause of the failure and correct it such that the final assembled system can operate properly. Troubleshooting documents may be prepared to assist technicians with determining the root cause of the problem and how to fix it. In a broader sense, any type of process flow documents may be created to guide users through a process that includes many actions and decisions. Process flow chart documents can be difficult to work with as some are overly detailed and technical, while others can be overly simplistic and lack sufficient information or explanation of methodology.

Flow charts can be helpful when created for troubleshooting, as well as outlining a specific process. Flow charts can enable a technician to follow a path of tests and decision points to work towards identifying a root cause and associated remedy, or in a broader sense, a flow chart can guide users through the steps necessary to complete a process that includes many actions and decisions. However, a collection of flow charts can also be challenging to deal with when there are a large number of flow charts to search through and a large number of steps and paths within each flow chart.

Flow chart development tools often involve complex configuration and layout options that result in a long training period and a cumbersome flow chart creation process for flow chart developers. While a large number of options in a flow chart development tool can provide for a wide range of customizations, it also increases the likelihood of non-uniform flow chart design when multiple flow chart developers are involved. Overly complex and/or non-uniform flow charts can result in greater effort by flow chart users to understand the flow charts and makes automated flow chart analysis tools more difficult to implement.

SUMMARY

According to one embodiment of the present invention, a method for building an interactive multimedia process flow chart is provided. The method includes displaying a process flow chart in an interactive graphically editable format on a user interface. The process flow chart includes a plurality of nodes each located entirely in a single node cell of a node grid. A pair of output hubs on a decision node of the process flow chart is linked to a pair of nodes defining a yes-path and a no-path. An output hub of a process step node of the process flow chart is linked to a single node defining a next process step. A link is established to an end node of the process flow chart absent any output links from the end node. The decision node, the process step node, and the end node each have a common shape including a display region illustrating node information and an editing command region depicting at least one node editing command.

According to another embodiment of the present invention, an interactive multimedia process flow chart system is provided. The system includes memory holding an interactive multimedia process flow chart builder tool and processing circuitry coupled to the memory. The interactive multimedia process flow chart builder tool is executable by the processing circuitry to display a process flow chart in an interactive graphically editable format on a user interface. The process flow chart includes a plurality of nodes each located entirely in a single node cell of a node grid. A pair of output hubs on a decision node of the process flow chart is linked to a pair of nodes defining a yes-path and a no-path. An output hub of a process step node of the process flow chart is linked to a single node defining a next process step. A link is established to an end node of the process flow chart absent any output links from the end node. The decision node, the process step node, and the end node each have a common shape including a display region illustrating node information and an editing command region depicting at least one node editing command.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
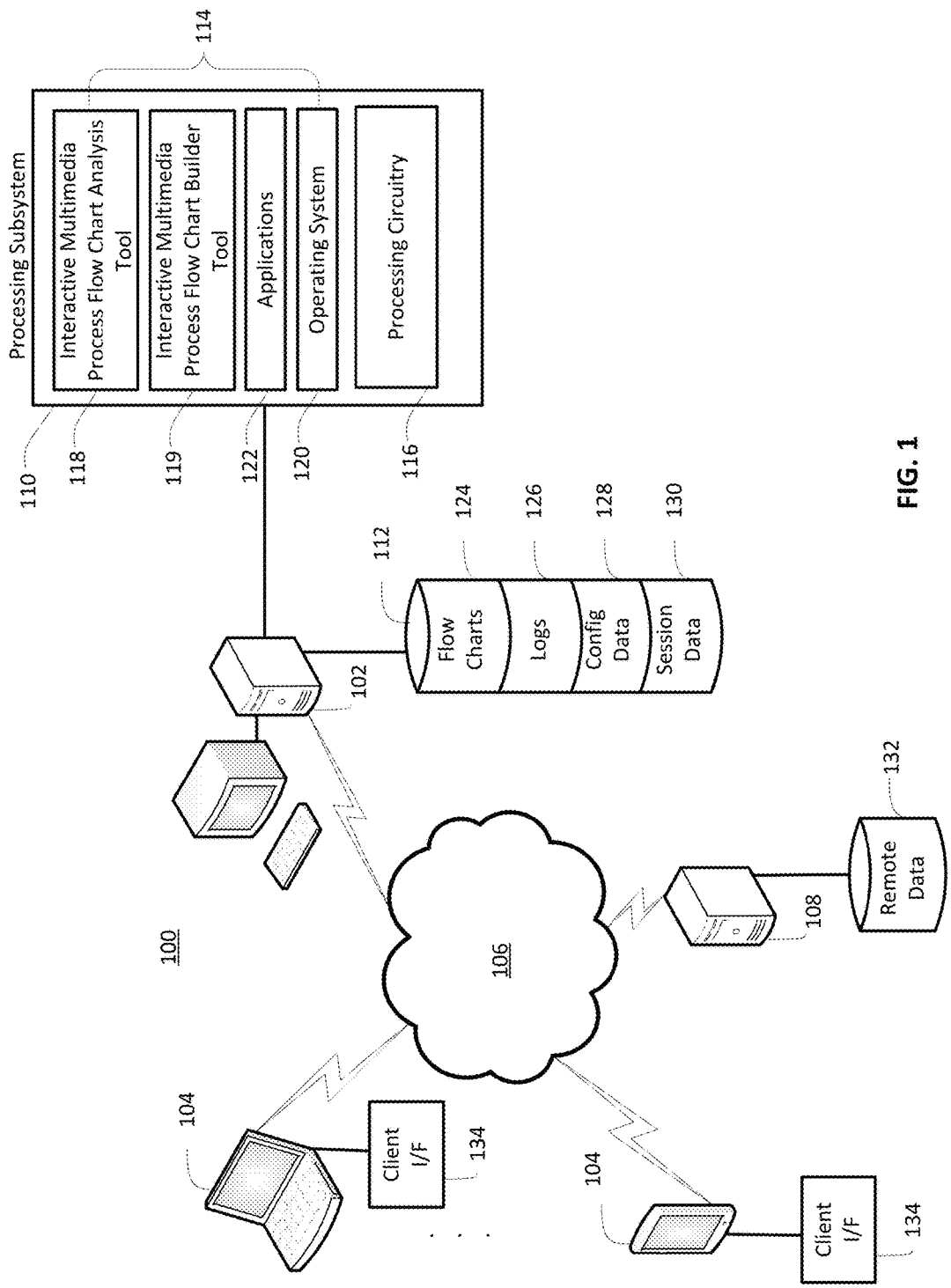
FIG. 1 illustrates a block diagram of an exemplary embodiment of a system for building and analysis of interactive multimedia process flow charts.

The embodiments described herein include systems and methods for building and analysis of interactive multimedia process flow charts. FIG. 1 illustrates a block diagram of an exemplary embodiment of system 100 including an interactive multimedia process flow chart system 102 and a plurality of client systems 104 that are configured to communicate via a network 106. Other computer systems, such as a remote server 108 may also be coupled to the network 106. The network 106 may be an Ethernet network and can include a combination of wired, wireless, and/or optical links, as well as routers, hubs, switches, and the like (not depicted) to enable communication. It will be understood that functionality of the interactive multimedia process flow chart system 102 is not limited to a single computer system but can be distributed across multiple computer systems, e.g., distributed across the network 106.

In the example of FIG. 1, the interactive multimedia process flow chart system 102 includes a processing subsystem 110 and a data storage system 112. The processing subsystem 110 includes memory 114 coupled to processing circuitry 116, and other computer system support elements known in the art. The memory 114 may include an interactive multimedia process flow chart analysis tool 118, an interactive multimedia process flow chart builder tool 119, an operating system 120, and other applications 122. The interactive multimedia process flow chart analysis tool 118 and the interactive multimedia process flow chart builder tool 119 can be implemented as applications executable by the processing circuitry 116 through the operating system 120. The interactive multimedia process flow chart analysis tool 118 may access the data storage system 112 for reading and writing a plurality of process flow charts 124, logs 126, configuration data 128, and session data 130. Based on links in one or more of the process flow charts 124, the interactive multimedia process flow chart analysis tool 118 may also access remote data 132 on the remote server 108 across the network 106 to support usage activities.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and/or audio output. The client systems 104 can include various computer/communication hardware and software technology known in the art, such as one or more processing units or circuits, volatile and non-volatile memory including removable media, power supplies, network interfaces, support circuitry, operating systems, and the like. The client systems 104 can each execute one or more client interfaces 134 that are operable to communicate through the network 106 with the interactive multimedia process flow chart system 102. The interactive multimedia process flow chart analysis tool 118 and/or the interactive multimedia process flow chart builder tool 119 may be accessible through one or more client interfaces 134 on the client systems 104 via the network 106 to navigate, edit, or create the process flow charts 124.

The process flow charts 124 may be defined as extensible markup language (XML) files that specify process steps and decisions as nodes, along with node categories, links, relationships between other nodes, additional information, links to images or video, user mode specific information, session attributes, configuration attributes, and the like. Defining the process flow charts 124 in XML or another known language can simplify definition and updating of the process flow charts 124 by avoiding complex proprietary definition languages, tools, and hardcoded solutions. The process flow charts 124 can be developed using a simple editor or a more robust development tool, such as the interactive multimedia process flow chart builder tool 119. The interactive multimedia process flow chart builder tool 119 provides an interactive graphically editable format for developing and/or editing the process flow charts 124. The interactive multimedia process flow chart builder tool 119 may be accessible through one or more client interfaces 134 on the client system 104 via the network 106 to create and/or edit the process flow charts 124.

Although the interactive multimedia process flow chart analysis tool 118 and the interactive multimedia process flow chart builder tool 119 are both depicted on the interactive multimedia process flow chart system 102, it will be understood that they can be implemented in separate computer systems. For example, the interactive multimedia process flow chart builder tool 119 on one instance of the interactive multimedia process flow chart system 102 may provide process flow charts 124 for use by the interactive multimedia process flow chart analysis tool 118 on a separate instance of the interactive multimedia process flow chart system 102. Additionally, the interactive multimedia process flow chart analysis tool 118 is not limited to using the process flow charts 124 developed through the interactive multimedia process flow chart builder tool 119. In another example, the process flow charts 124 are developed using a simple text-based editing tool, e.g., at a client system 104, and are provided to the interactive multimedia process flow chart analysis tool 118 across the network 106. Accordingly, a number of process flow chart developers and users can collaborate to build and/or use the process flow charts 124.

Figure 2:
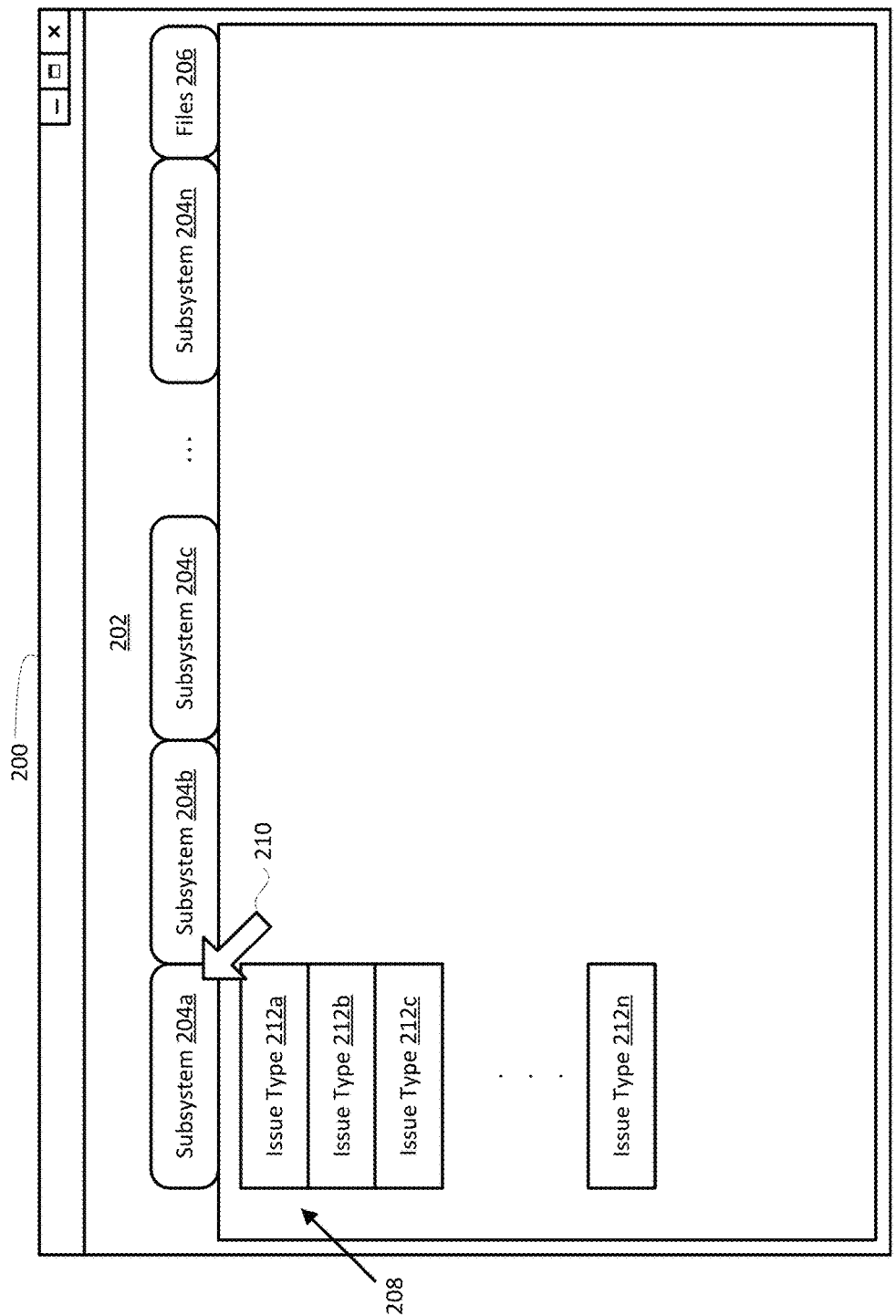
FIG. 2 illustrates an example of a user interface of an interactive multimedia process flow chart analysis tool.

FIG. 2 illustrates an example of a user interface 200 of a main menu page of the interactive multimedia process flow chart analysis tool 118 of FIG. 1. The user interface 200 may be interactively displayed on one of the client interfaces 134 of FIG. 1. The user interface 200 can include a plurality of tabs 202 associated with different actions or subsystems. The tabs 202 and drop-down menu items can be defined in an XML file and loaded by the interactive multimedia process flow chart analysis tool 118 of FIG. 1 to build menu buttons dynamically at startup. In the example of FIG. 2, there are tabs 202 for subsystem 204a, subsystem 204b, subsystem 204c, to subsystem 204n, as well as files tab 206. Examples of subsystem 204a-204n can include a video subsystem, a movement subsystem, a distance measurement subsystem, a laser subsystem, an alignment subsystem, miscellaneous subsystems, and the like. Upon selecting one of the tabs 202, additional options can be displayed as a dropdown list 208.

In the example of FIG. 2, upon making a selection 210 of the subsystem 204a, the dropdown list 208 is populated with issue type 212a, issue type 212b, issue type 212c, to issue type 212n. For a troubleshooting application, examples of issue types in issue type 212a-212n can include display issues, missing input issues, sensor issues, formatting issues, and the like. Each issue type 212a-212n may have an associated troubleshooting tree as a type of process flow chart in the process flow charts 124 of FIG. 1. Selection of a particular issue type 212a-212n can result in loading the associated process flow charts.

For other types of process flow charts, the tabs 202 and the dropdown list 208 can be populated with different information to organize access to the process flow charts 124 of FIG. 1. For instance, in a medical diagnosis application, the tabs 202 may be populated with body systems or body parts, and the dropdown list 208 can be populated with symptoms. In an apparatus assembly application, the tabs 202 can be populated with subsystems of the apparatus, and the dropdown list 208 can be populated with component assembly instructions. In an educational application, the tabs 202 can be populated with subjects and the dropdown list 208 can be populated with lesson plans. In a game or interactive storybook application, the tabs 202 can be populated with themes and the dropdown list 208 can be populated with corresponding modules or chapters. While several examples are given, embodiments are not so limited, as any variety of subject matter that can be rendered in a flow chart format may be captured in the process flow charts 124 of FIG. 1 and made accessible in an organized manner by the user interface 200.

The files tab 206 can be used to load a saved process flow chart associated with a previously saved session from the session data 130 of FIG. 1. Upon opening the saved process flow chart, a current node when the file was saved will be emphasized graphically. Also, the path taken prior to reaching the current node will be highlighted. And finally, a log will be populated with data corresponding to user decisions made and actions taken up to the current node.

Figure 3:
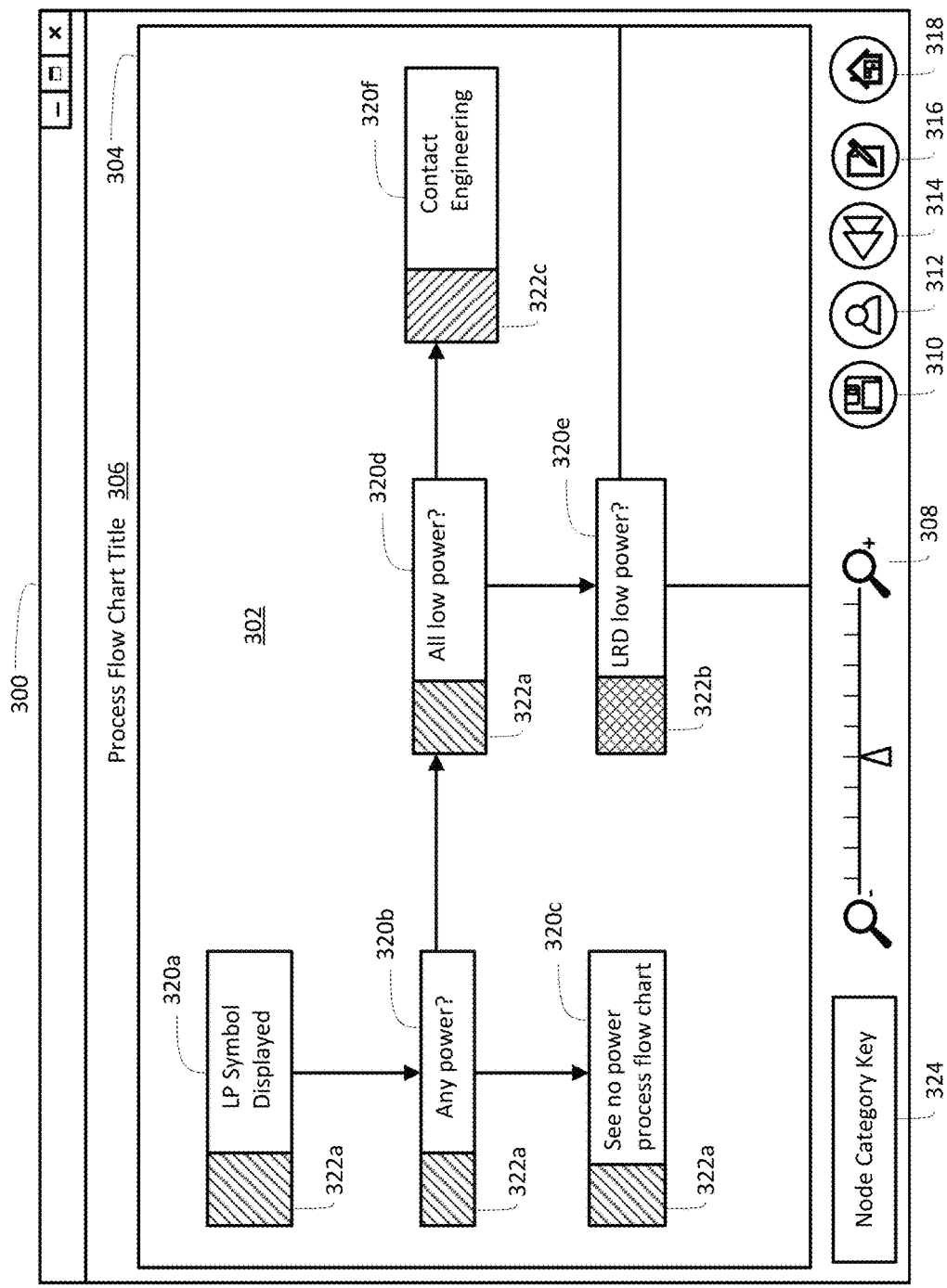
FIG. 3 illustrates an example of a process flow chart in the main interface of the interactive multimedia process flow chart analysis tool.

FIG. 3 illustrates an example of a user interface 300 of the interactive multimedia process flow chart analysis tool 118 of FIG. 1 displaying a process flow chart 302. The user interface 300 may be interactively displayed on one of the client interfaces 134 of FIG. 1. The user interface 300 provides a multimedia environment to display text, graphics, audio clips, video clips, animation, and the like. The user interface 300 can include a process flow chart pane 304 and a process flow chart title 306 that identifies the process flow chart 302 in the process flow chart pane 304.

The user interface 300 can also include a number of controls, such as a zoom control 308, a save session control 310, a change user mode control 312, a back button 314, a view log control 316, and a return to main menu control 318. The zoom control 308 rescales the contents of the process flow chart pane 304 to enable a user to view different levels of detail of the process flow chart 302. The save session control 310 can save data associated with the current session, such as decisions, paths followed for the process flow chart 302, and other logged data to the session data 130 of FIG. 1 such that the current session can be restored from the data storage system 112 of FIG. 1 at a later time. The change user mode control 312 can change the user mode between a Guided or Manual mode of the process flow chart 302. In Guided mode, the process flow chart 302 automatically repositions itself after the user responds to the current node by clicking a transition indication, such as 'yes', 'no', or 'ok', to automate navigation through the process flow chart 302. In Manual mode, the user must move the process flow chart 302 around the screen manually and is free to click on any node in the process flow chart 302 to view any associated additional information, images, video, etc. User and user mode specific information can be stored in the configuration data 128 of FIG. 1. The back button 314 can be used to undo previous decisions made in navigating through the process flow chart 302 and remove associated entries from the log 126 of FIG. 1. The view log control 316 can be used to open a log associated with the process flow chart 302 from the logs 126 of FIG. 1. The return to main menu control 318 can navigate back to the user interface 200 of FIG. 2.

The example of FIG. 3 depicts a partial view of the process flow chart 302 in the process flow chart pane 304. In this example, node 320a is an initial or head node of the process flow chart 302 and has a portion formatted (e.g., left side of node 320a in FIG. 3) to indicate a first node category 322a. Node 320a connects to node 320b which also of the first node category 322a. Node 320a is an example of a process step node in that there is an action to be performed but no decision to be made, and node 320b is a next process step with respect to node 320a. Node 320b is a decision node that connects to node 320c and node 320d. Node 320c is a terminal or end node and is also of the first node category 322a in this example. Node 320d is of the first node category 322a and connects to node 320e and node 320f as a decision node. In this example, node 320e is of a second node category 322b and is a decision node that has additional connections which are not presently visible in the process flow chart pane 304. Node 320f is another example of a terminal or end node and is of a third node category 322c.

A node category key 324 may be provided to define the meaning of the node categories 322, which can be distinguished by different colors and/or patterns. As one example, the node categories 322 can be defined for troubleshooting steps that involve characterizing an issue, eliminating test equipment, eliminating software/firmware, eliminating interconnections, eliminating components, or identifying a need for engineering support. As a sequence of decisions, tests, and other steps narrow the possible reasons for the issue, the root cause can be isolated and the issue corrected or more precisely refined. Formatting a portion of each node 320 in the process flow chart 302 to indicate a node category 322 assigned to each node 320 provides a visual indication to assist users in understanding the purpose of each decision presented in the process flow chart 302. Upon reaching or selecting a terminal or end node, additional options may be presented to link to another of the process flow charts 124 of FIG. 1 or to perform an action such as triggering an e-mail message, instant message, alert, or writing session information to a data file for data collection and analysis.

Figure 4:
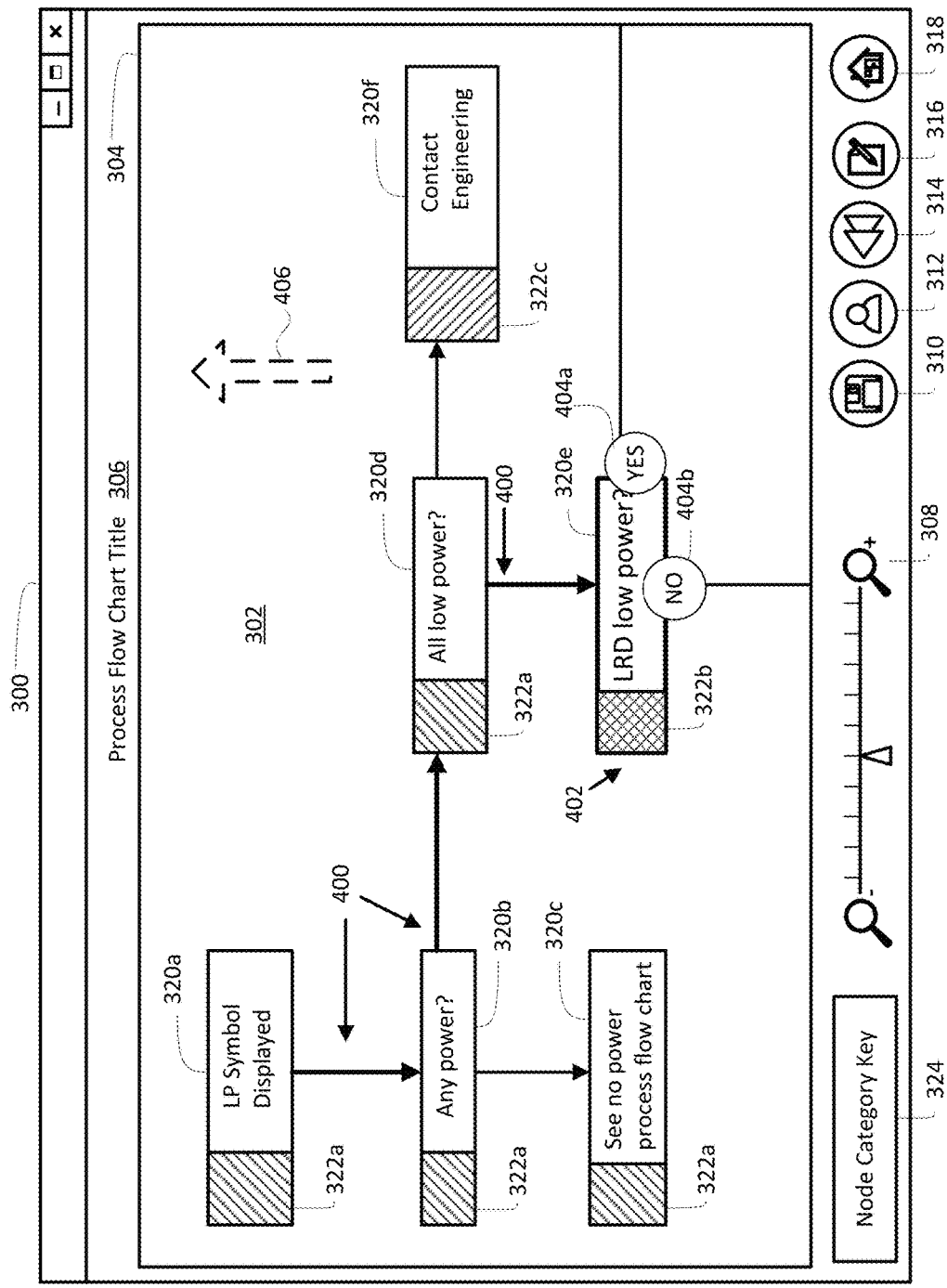
FIG. 4 illustrates an example of decision options associated with a current node in the process flow chart of the interactive multimedia process flow chart analysis tool.

FIG. 4 illustrates an example of decision options 404 associated with a current node 402 in the process flow chart 302 of the interactive multimedia process flow chart analysis tool 118 of FIG. 1. A user can manually traverse the process flow chart 302 or can use a Guided mode of operation to advance between decisions to a subsequent node. Manual traversal can be performed, for example, by applying a dragging motion 406 on the process flow chart 302 in the process flow chart pane 304 to select a later point in the process flow chart 302 as the current node 402. In Guided mode, the process flow chart 302 automatically moves into position, for instance, such that the node of interest is centered in process flow chart pane 304. In the example of FIG. 4, node 320e is the current node 402. A current path 400 is defined from node 320a to node 320b to node 320d to the current node 402. The current path 400 may be accentuated using a visual indication such as highlighting, boldface, color change, and/or other attribute modification. Additionally, the current node 402 can be visually indicated by highlighting, boldface, color change, enlarged font and/or other attribute modification.

The current node 402 in this example includes a decision that provides two decision options 404 as a YES decision option 404a and a NO decision option 404b. Selecting the YES decision option 404a leads to a subsequent node not currently visible, and selecting the NO decision option 404b leads to a subsequent node also not currently visible in this example. As each decision is made by selecting one of the decision options 404, a history of decisions along the current path 400 is stored in one of the logs 126 of FIG. 1 based on receiving a request to advance in the process flow chart 302, where each of the decision options 404 is considered a request to advance when selected.

The process flow chart 302 can be automatically repositioned in the process flow chart pane 304 on the user interface 300 based on a user selection of the one or more decision options 404 associated with the current node 402. Automated repositioning can occur upon each selection to substantially center the current node 402 in the process flow chart pane 304, or automated repositioning can occur when a selection is made to traverse to a node 320 that is not currently visible in the process flow chart pane 304. In this example, upon selecting the NO decision option 404b as a request at node 320e, the interactive multimedia process flow chart analysis tool 118 of FIG. 1 can shift the process flow chart 302 within the process flow chart pane 304 to display a subsequent node as illustrated in FIG. 5.

Figure 5:
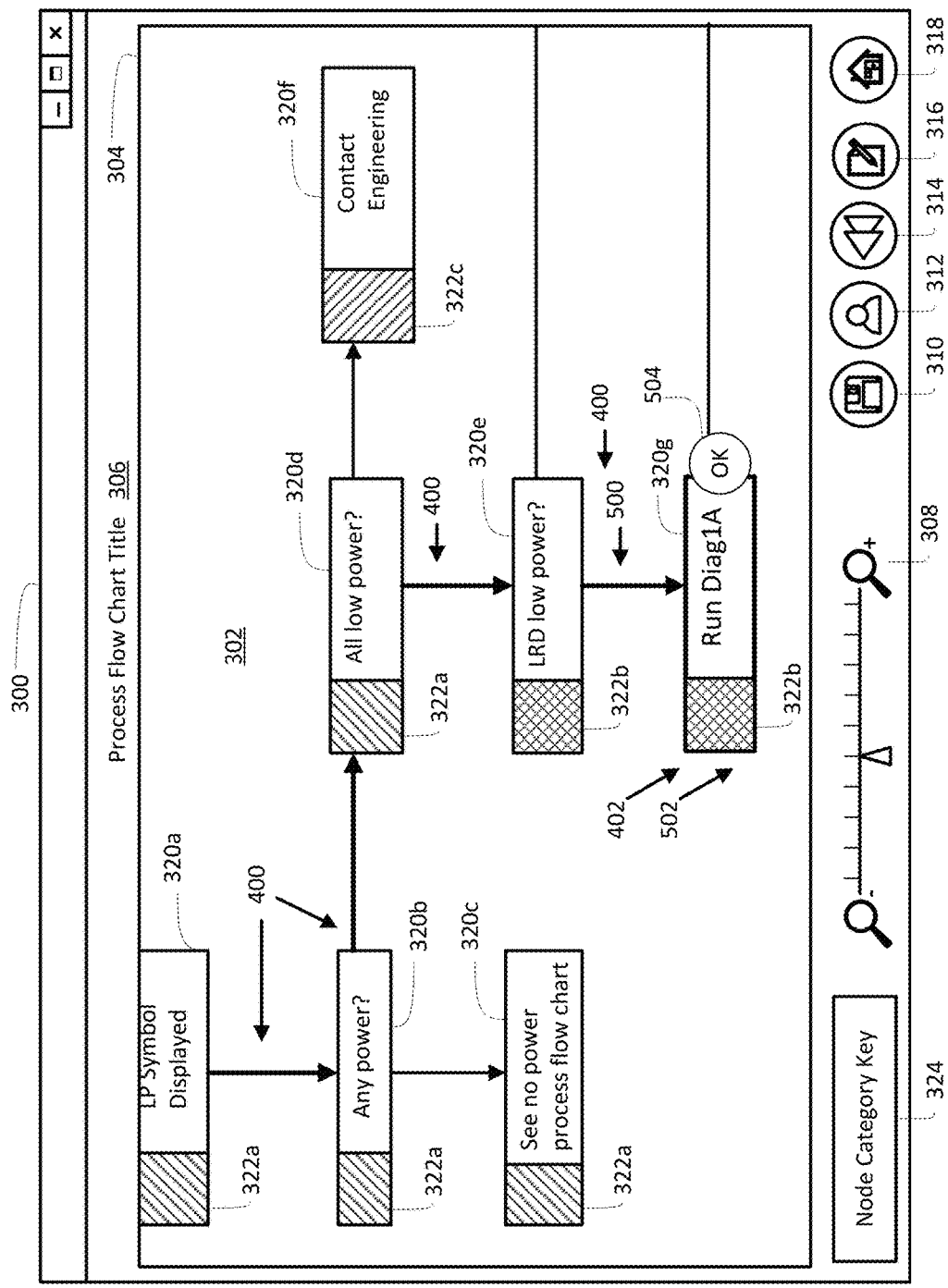
FIG. 5 illustrates an example of progressing to a subsequent node in the process flow chart of the interactive multimedia process flow chart analysis tool.

FIG. 5 illustrates an example of progressing to a subsequent node 502 in the process flow chart 302 of the interactive multimedia process flow chart analysis tool 118 of FIG. 1. Upon a user selection of the NO decision option 404b of FIG. 4, as a request at node 320e, the interactive multimedia process flow chart analysis tool 118 of FIG. 1 traverses to the subsequent node 502 in the process flow chart 302 based on the request. Traversing can also remove previously displayed decision options and highlighting associated with a previous node that was identified as the current node 402, such as decision options 404a and 404b and node 320e of FIG. 4. A visual indication of the current path 400 is updated to include a path 500 to the subsequent node 502. Node 320g is the subsequent node 502 in this example and is a process step node of the second node category 322b. A history of decisions along the current path 400 is stored in one of the logs 126 of FIG. 1 based on receiving the request including the path 500. In the example of FIG. 5, a decision option 504 of the node 320g is a simple "OK" button indicating that upon completing a designated action associated with the node 320g, selection of the decision option 504 will advance the current path 400 again in the process flow chart 302 and may also reposition the process flow chart 302 in the process flow chart pane 304.

Figure 6:
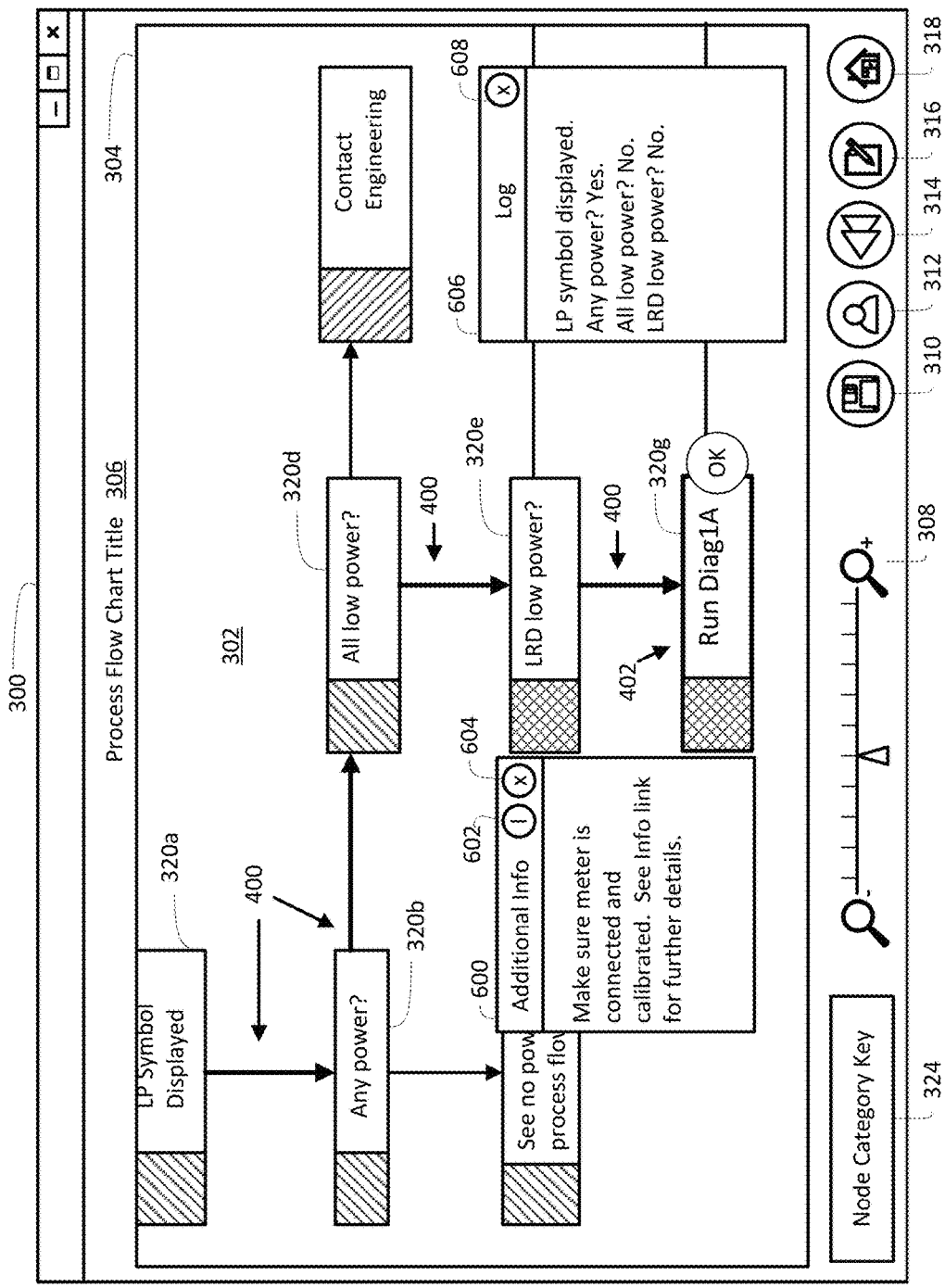
FIG. 6 illustrates an example of additional information and a log for the process flow chart of the interactive multimedia process flow chart analysis tool.

FIG. 6 illustrates an example of additional information and a troubleshooting log for the process flow chart 302 of the interactive multimedia process flow chart analysis tool 118 of FIG. 1. Each node 320 may provide a selectable option or automated popup message to display additional information, which may be in the form of text, hyperlinks, images, video, etc. In the example of FIG. 6, additional information 600 is associated with node 320g as the current node 402. The additional information 600 can elaborate on details of the node 320g and provide one or more links to the remote data 132 of FIG. 1. In this example, icon 602 is configured to access associated information in the remote data 132 of FIG. 1, such as video or images, and icon 604 is configured to close the additional information 600. If icon 604 is not clicked, the additional information window 600 will automatically close when the next node is selected, thus reducing undesirable clutter.

Selecting the view log control 316 can display a log 606 associated with the current session. In the example of FIG. 6, the log 606 includes decisions and answers associated with the current path 400 leading to the current node 402. For example, the history of decisions along the current path 400 can include: acknowledgement that a low power (LP) symbol is displayed at node 320a, confirming that there is power at node 320b, confirming that there is not an all low power condition at node 320d, and confirming that a Laser Range Designator (LRD) low power condition does not exist at node 320e. The log 606 can be updated in real-time as additional requests to advance in the process flow chart 302 are received, such as selecting a decision option or confirming a step in each node 320. Selecting icon 608 closes the log 606. When the log 606 is closed, additional decisions are still recorded but may not be visible to a user unless the view log control 316 is activated again.

Figure 7:
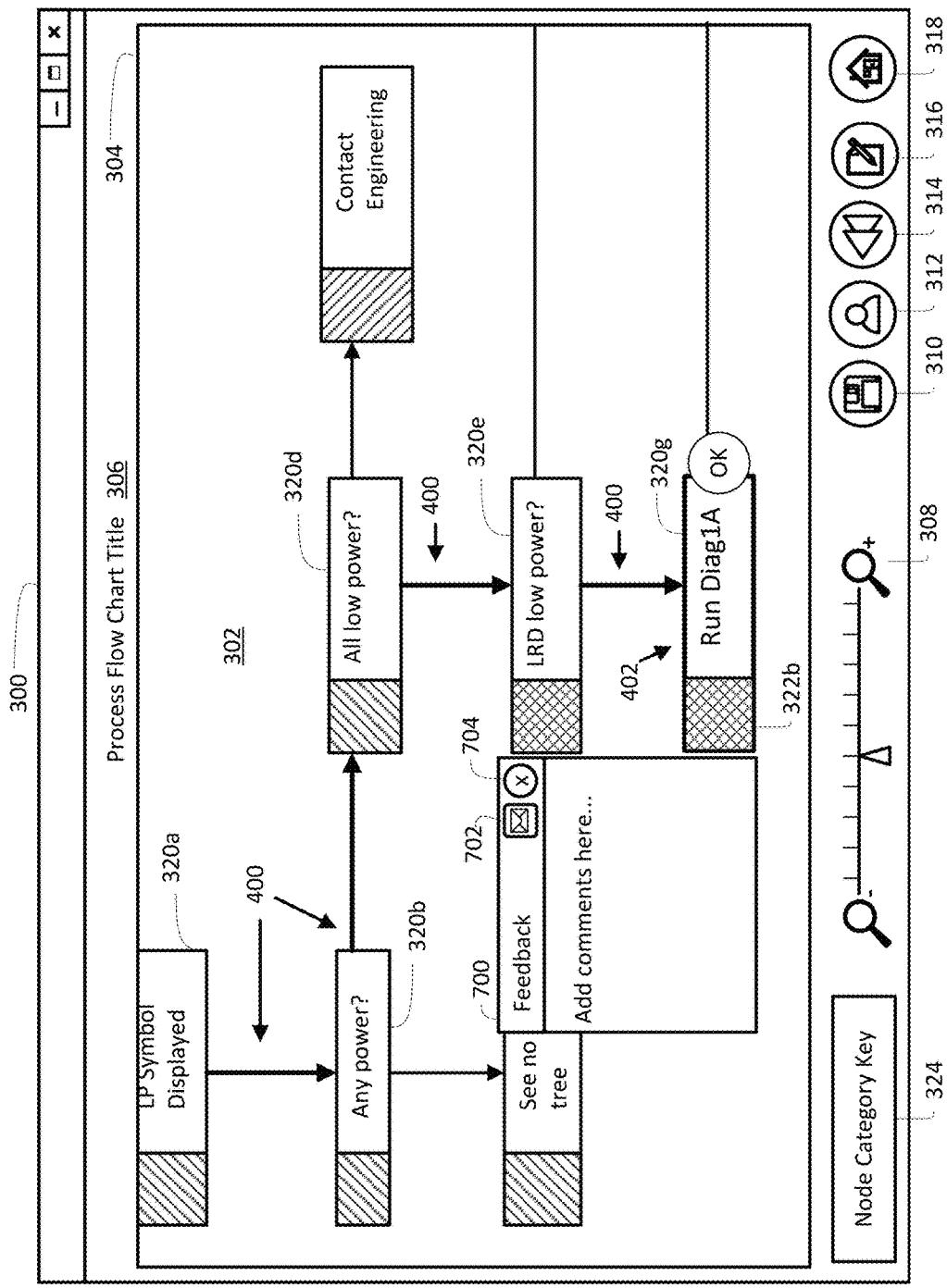
FIG. 7 illustrates an example of a feedback panel for the process flow chart of the interactive multimedia process flow chart analysis tool.

FIG. 7 illustrates an example of a feedback panel 700 for the process flow chart 302 of the interactive multimedia process flow chart analysis tool 118 of FIG. 1. Each node 320 in the process flow chart 302 can be provided with a feedback component, which is embodied as the feedback panel 700 in this example. The feedback panel 700 may be opened by a user selecting a node category 322 of the current node 402. In the example of FIG. 7, the feedback panel 700 is opened when a user clicks on the node category 322b of node 320g, which is the current node 402. The feedback panel 700 allows users to comment about a specific node 320, such as node 320g, or about the sequences of decisions to reach the node 320g. A letter icon 702 can be used to send the feedback, and icon 704 can be used to close the feedback panel 700 without sending feedback. Additionally, to reduce clutter, the feedback panel 700 will automatically close when the user traverses to a subsequent node.

Figure 8:
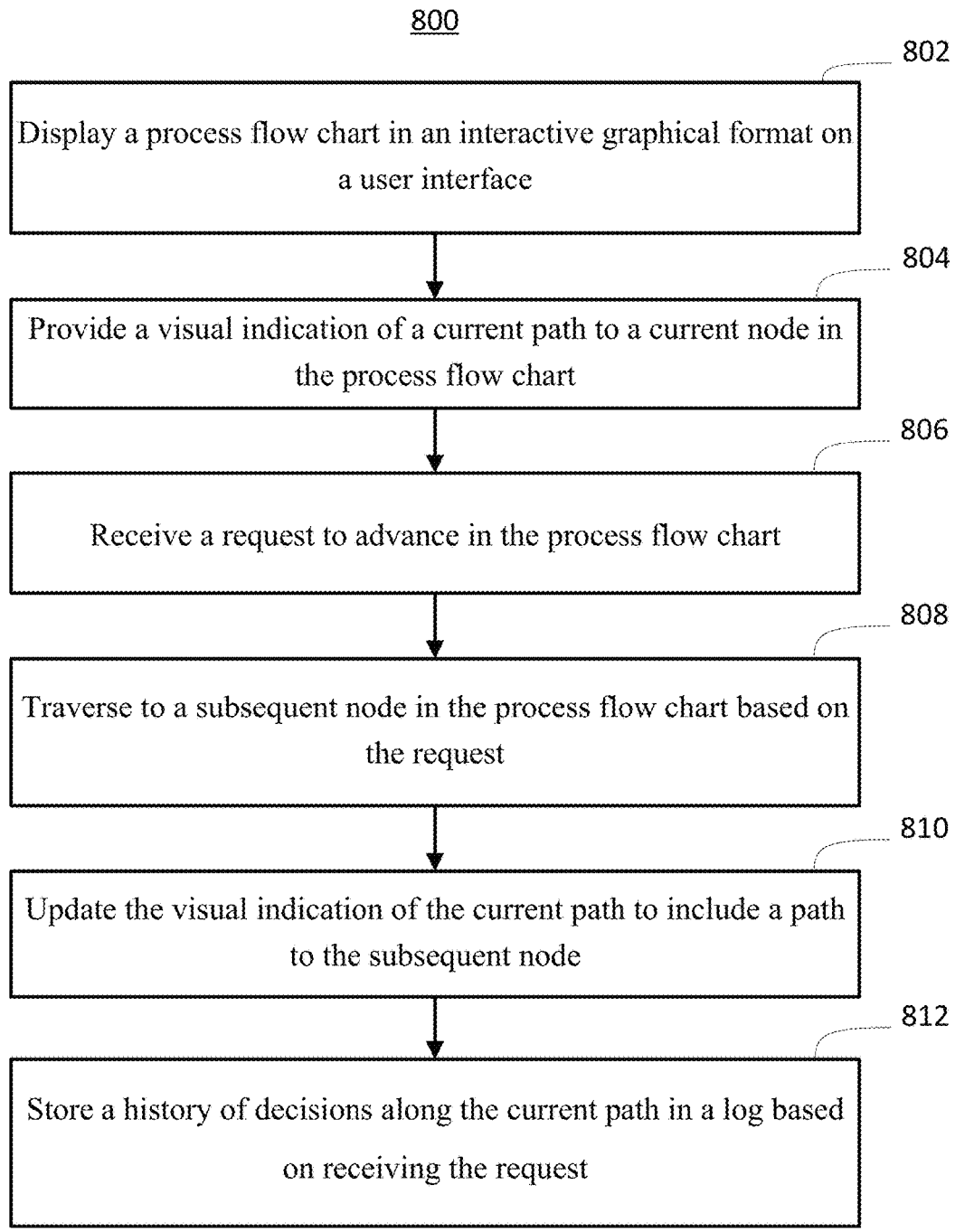
FIG. 8 illustrates an exemplary process for interactive multimedia process flow chart analysis.

FIG. 8 illustrates an exemplary process 800 for interactive multimedia process flow chart analysis. The process 800 can be implemented in the system 100 of FIG. 1. The process 800 is described in reference to FIGS. 1-8, and may be performed by the interactive multimedia process flow chart system 102 and/or in combination with one or more of the client systems 104. In an exemplary embodiment, the interactive multimedia process flow chart analysis tool 118 performs the process 800 in conjunction with one of the client interfaces 134. The interactive multimedia process flow chart analysis tool 118 configures the processing circuitry 116 to perform the process 800.

Initially, the interactive multimedia process flow chart analysis tool 118 may display a main menu page that displays all of the category sub-menus and drop down menus from which a user chooses a specific process flow chart to view. At block 802, the interactive multimedia process flow chart analysis tool 118 displays a process flow chart 302 in an interactive graphical format on user interface 300. At block 804, the interactive multimedia process flow chart analysis tool 118 provides a visual indication of a current path 400 to a current node 402 in the process flow chart 302. At block 806, the interactive multimedia process flow chart analysis tool 118 receives a request to advance in the process flow chart 302, such as selection of a decision option 404a, 404b. At block 808, the interactive multimedia process flow chart analysis tool 118 traverses to a subsequent node 502 in the process flow chart 302 based on the request. At block 810, the interactive multimedia process flow chart analysis tool 118 updates the visual indication of the current path 400 to include a path 500 to the subsequent node 502.

The subsequent node 502 can be reassigned as the current node 402 and a visual indication of the current node 402 may be changed based on one or more decision options 404, 504 associated with the current node 402. The process flow chart 302 can be repositioned on the user interface 300 based on a user selection of the one or more decision options 404, 504 associated with the current node 402. The process flow chart 302 may also be repositioned on the user interface 300 based on detection of a dragging motion 406 on the process flow chart 302 in the process flow chart pane 304.

At block 812, the interactive multimedia process flow chart analysis tool 118 stores a history of decisions along the current path 400 in a log 606 based on receiving the request. The interactive multimedia process flow chart analysis tool 118 can update the log 606 in real-time as additional requests to advance in the process flow chart 302 are received.

Controls such as the save session control 310 of the user interface 300 allow a user to save a current session to the data storage system 112 in session data 130 that can include the process flow chart 302, the log 606, and the current path 400 based on a user request. The user interface 200 enables a user to restore the current session from the session data 130 of the data storage system 112 to reload the process flow chart 302, the log 606, and the current path 400 at a later time. The process flow chart 302 can be stored with the plurality of process flow charts 124 on the data storage system 112. The user interface 200 can provide a user with access to the plurality of process flow charts 124 and load the process flow chart 302 from the data storage system 112 based on a selection of the user.

As previously described, a portion of each node 320 in the process flow chart 302 may be formatted to indicate a node category 322 assigned to each node 320. The interactive multimedia process flow chart analysis tool 118 can also link a node 320 of the process flow chart 302 with remote data 132 (e.g., images, videos, etc.) to provide additional information 600 associated with the node 320. A feedback component can be provided from each node 320 of the process flow chart 302, e.g., the feedback panel 700.

Figure 9:
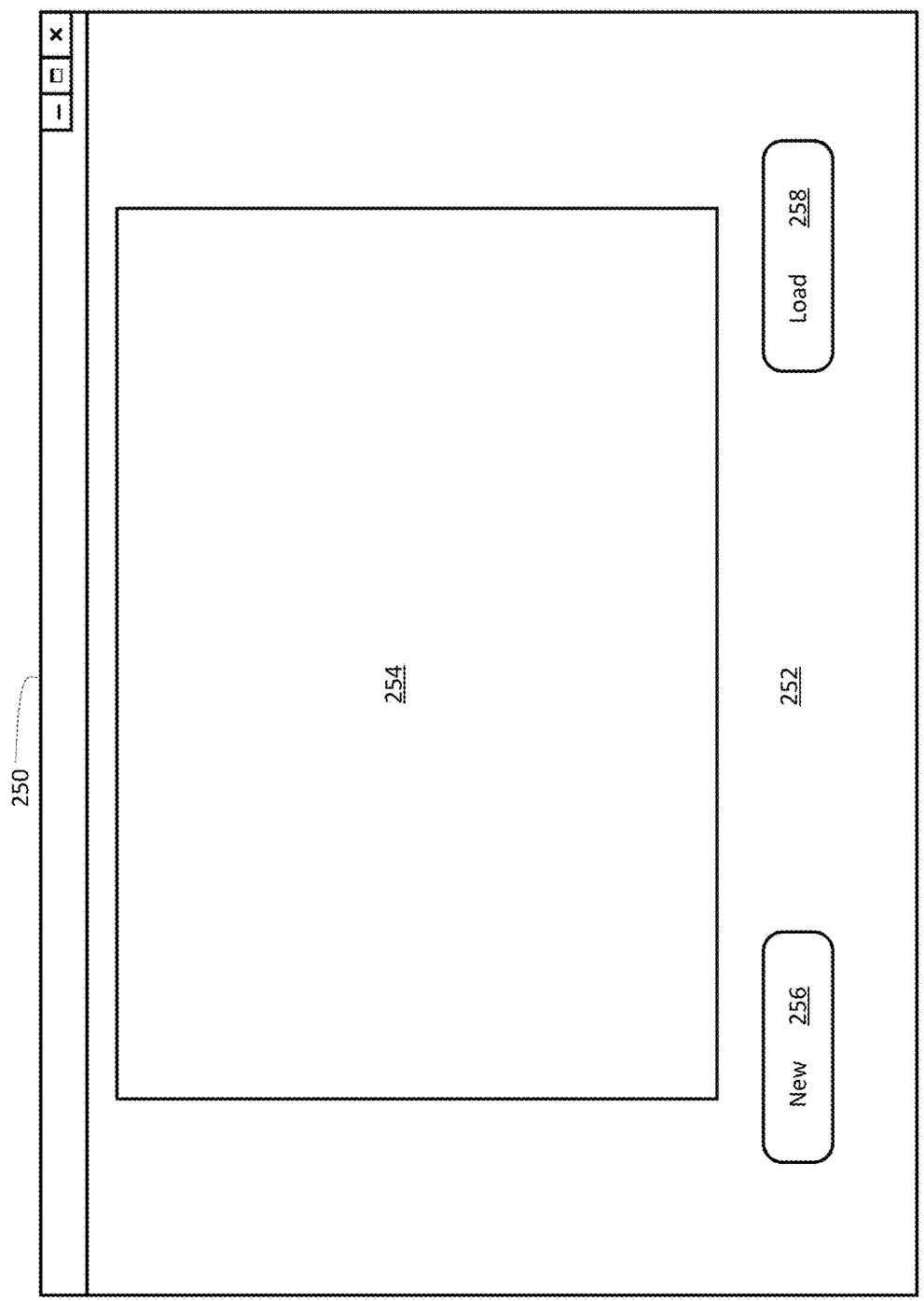
FIG. 9 illustrates an example of a main menu page of an interactive multimedia process flow chart builder tool.
Figure 10:
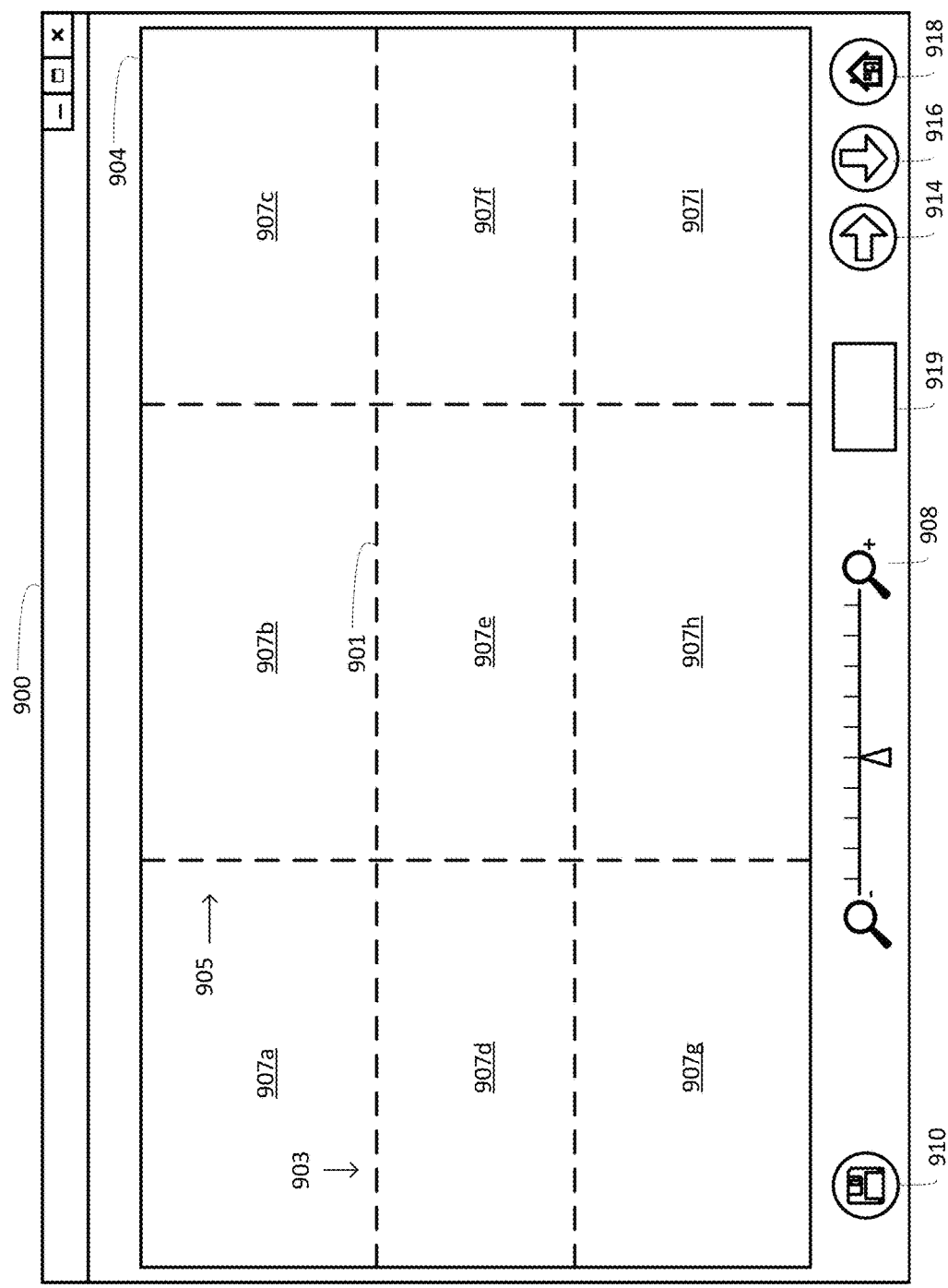
FIG. 10 illustrates an example of a user interface of the interactive multimedia process flow chart builder tool.

FIG. 9 illustrates an example of a user interface 250 of a main menu page 252 of the interactive multimedia process flow chart builder tool 119 of FIG. 1. The user interface 250 may be interactively displayed on one of the client interfaces 134 of FIG. 1. The main menu page 252 can include a graphical display region 254 that may provide tool title and version information associated with the interactive multimedia process flow chart builder tool 119 of FIG. 1 in combination with one or more images. In the example of FIG. 9, only two options are presented on the main menu page 252, a new process flow chart icon 256 and a load existing process flow chart icon 258; however, additional options can be included in embodiments. In response to detecting a user selection of the new process flow chart icon 256, the interactive multimedia process flow chart builder tool 119 of FIG. 1 can launch a user interface with a blank stage, such as the user interface 900 as depicted in FIG. 10. In response to detecting a user selection of the load existing process flow chart icon 258, the interactive multimedia process flow chart builder tool 119 of FIG. 1 enables user selection of one or more previously saved process flow charts for editing from the process flow charts 124 and launches a user interface with the selected process flow chart, such as the process flow chart 902 under development in the user interface 900 as depicted in FIG. 11.

FIG. 10 illustrates an example of a user interface 900 of the interactive multimedia process flow chart builder tool 119 of FIG. 1 for creating and/or editing a process flow chart. The user interface 900 may be interactively displayed on one of the client interfaces 134 of FIG. 1. The user interface 900 can include a process flow chart pane 904 and a number of controls, such as a zoom control 908, a save session control 910, an insert column at end command 914, an insert row at bottom command 916, a return to main menu control 918, and a new node command icon 919. The zoom control 908 rescales the contents of the process flow chart pane 904 to enable a user to view different levels of detail. The save session control 910 can save data associated with a newly created or edited process flow chart to the process flow charts 124 in a markup language file format on the data storage system 112 of FIG. 1. The return to main menu control 918 can navigate back to the main menu page 252 of FIG. 9 that allows a different process flow chart to be loaded or created.

In the example of FIG. 10, a node grid 901 is depicted as overlaid upon the process flow chart pane 904. In exemplary embodiments, the node grid 901 is not visible on the process flow chart pane 904 but is used by the interactive multimedia process flow chart builder tool 119 of FIG. 1 to control placement of nodes in a process flow chart. The node grid 901 includes a plurality of rows 903 and columns 905 of node cells 907. In the example of FIG. 10, nine node cells 907a, 907b, 907c, 907d, 907e, 907f, 907g, 907h, and 907i are depicted; however, it will be understood that a much larger number of node cells 907 can be defined for any number of rows 903 and columns 905. When a process flow chart is constructed in the process flow chart pane 904, each node of the process flow chart is located entirely in a single node cell 907 of the node grid 901. In contrast to other flow chart development tools that use a grid size smaller than each node or flow chart component, the interactive multimedia process flow chart builder tool 119 of FIG. 1 maintains a clean and well-organized process flow chart by default without requiring additional manual realignment steps.

Figure 11:
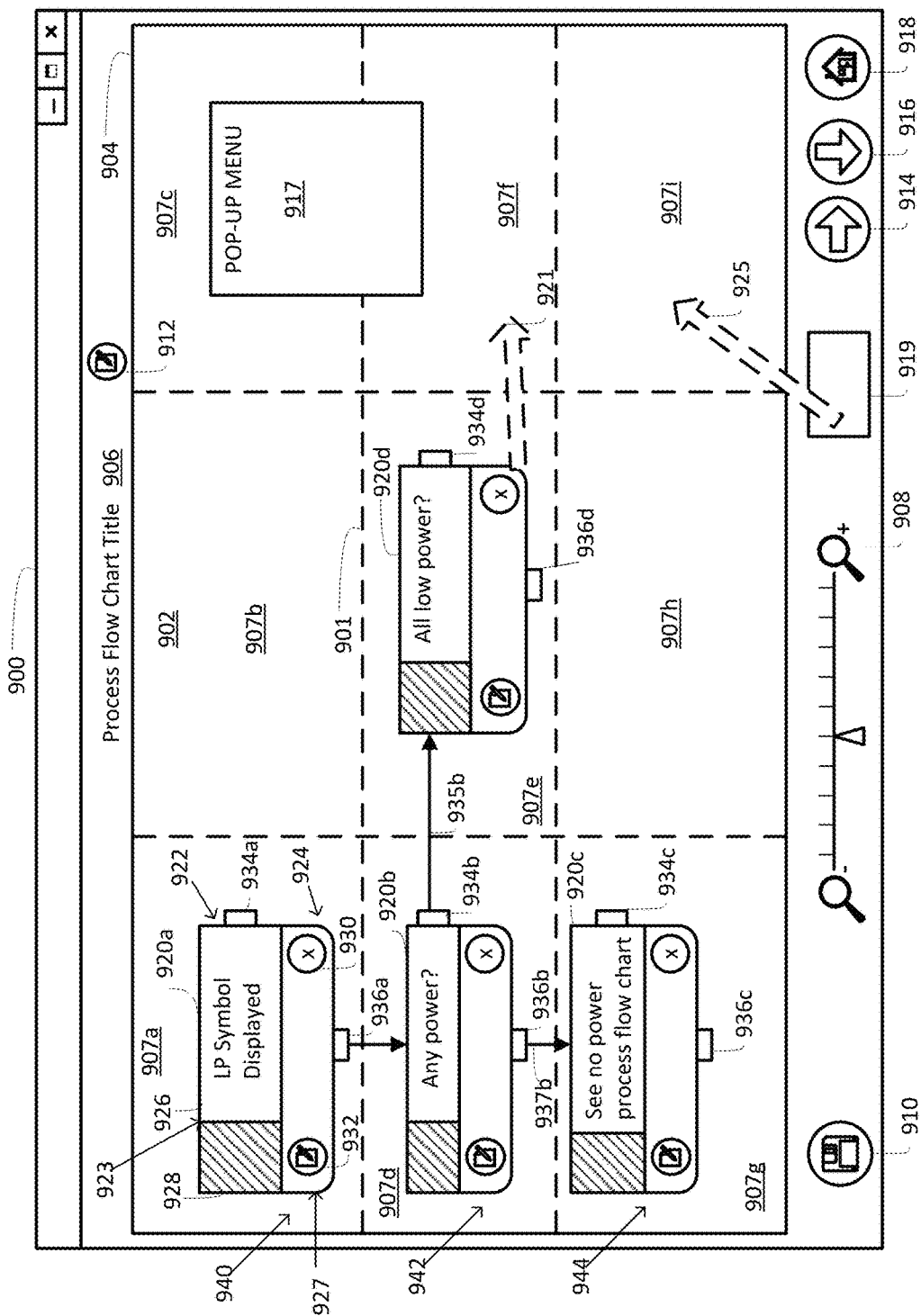
FIG. 11 illustrates an example of a process flow chart under development in the user interface of FIG. 10.

FIG. 11 illustrates an example of a process flow chart 902 under development in the user interface 900 of FIG. 10. In FIG. 11, the node grid 901 is not visible on the user interface 900. Each node 920 depicted in FIG. 11 is automatically aligned to and located entirely in a single node cell 907 of the node grid 901 by the interactive multimedia process flow chart builder tool 119 of FIG. 1 upon node 920 creation or attempted movement. For example, node 920a is in node cell 907a, node 920b is in node cell 907d, node 920c is in node cell 907g, and node 920d is in node cell 907e. Attempted movement of a node 920 results in automatic realign with another node cell 907. For instance, by dragging node 920d up and releasing it, the node 920d will snap back to node cell 907e unless more than about half of the node 920d is within node cell 907b, in which case node 920d will snap to be completely located within node cell 907b. In this way, each node 920 has a row location and a column location defined relative to the node grid 901.

As depicted in FIG. 11, the user interface 900 includes a title edit command 912 to enable user modification of a process flow chart title 906 associated with the process flow chart 902. The user interface 900 may also include an insert column at end command 914 operable to add a new node 920 to the process flow chart 902 in a node cell 907 at a column location adjacent to a right-most populated column based on detecting a user selection. For example, upon detecting user selection of the insert column at end command 914 by the interactive multimedia process flow chart builder tool 119 of FIG. 1, a new node 920 (not depicted) can be inserted in node cell 907f, where node 920d in node cell 907e is at the right-most populated column and node cell 907f is at an adjacent column location. The user interface 900 may also include an insert row at bottom command 916 operable to add a new node 920 to the process flow chart 902 in a node cell 907 at a row location adjacent a bottom-most populated row based on detecting a user selection. For example, upon detecting user selection of the insert row at bottom command 916 by the interactive multimedia process flow chart builder tool 119 of FIG. 1, a new node 920 (not depicted) can be inserted below node cell 907g, where node 920c in node cell 907g is at the bottom-most populated row.

To support actions at a particular location of the user interface 900, a user action such as a right click on the process flow chart pane 904 may open a menu 917 as a pop-up menu. In the example of FIG. 11, a user-selected location for opening menu 917 is node cell 907c. The placement of the menu 917 is not constrained by the node grid 901, as in this example, the menu 917 begins in node cell 907c and partially extends into node cell 907f. The menu 917 enables a plurality of commands to reposition one or more nodes 920 of the process flow chart 902 based on the user-selected location. Examples of commands that can be enabled by the menu 917 include a column insertion command, a column deletion command, a row insertion command, a row deletion command, and a node movement command. The column insertion command of menu 917 can shift all nodes 920 in the column of the user-selected location right by one column and likewise right shift by one column all of the nodes 920 presently to the right of the user-selected location. The column deletion command of menu 917 can remove all nodes 920 in the same column as the user-selected location and left shift by one column all of the nodes 920 presently to the right of the user-selected location. The row insertion command of menu 917 can shift all nodes 920 in the row of the user-selected location down by one row and likewise shift downward by one row all of the nodes 920 presently below the user-selected location. The row deletion command of menu 917 can remove all nodes 920 in the same row as the user-selected location and shift upward by one row all of the nodes 920 presently below the user-selected location. Node movement commands of menu 917 can include shifting a node 920 (and every node 920 above, below, to the left, or to the right of, depending on the command) in a node cell 907 at the user-selected location up, down, left, or right by one node cell location.

Directly clicking upon a node 920 and applying a dragging motion can also be used to reposition the node 920. For example, clicking on node 920d and applying a dragging motion 921 to node cell 907f can reposition the node 920d from node cell 907e to node cell 907f. User selectable actions can also be applied during repositioning of nodes 920 to maintain or break any existing links between nodes 920 that are repositioned. For instance, holding a control "Ctrl" key while repositioning a node 920 can be interpreted by the interactive multimedia process flow chart builder tool 119 of FIG. 1 as a request to maintain any existing links. If a user desires to remove a connection between two nodes 920 without moving either node 920, a connection such as yes-path 935b can be removed based on the interactive multimedia process flow chart builder tool 119 of FIG. 1 detecting a user-initiated click action on the connection, e.g., a single click on the yes-path 935b to remove it.

The user interface 900 can also include a new node command icon 919 operable to add a new node 920 to the process flow chart 902 in an unpopulated node cell 907 based on detecting a user-initiated dragging motion 925 from the new node command icon 919. For example, if the user interface 900 detects a click-and-hold operation on the new node command icon 919, a new node 920 can be placed in the node cell 907 where the user releases the click-and-hold operation provided that the corresponding node cell 907 does not already have a node 920 located therein. Dragging can be performed beyond visible boundaries of the present view, e.g., to the right or below node cell 907i.

Each node 920 includes display region 922 and an editing command region 924. The display region 922 includes node information 923, such as node wisdom 926 defining a process step or decision to display for each node 920 and a node category 928 indicating a type of action associated with each node 920. In the example of FIG. 11, node 920a includes node wisdom 926 of "LP Symbol Displayed". The node category 928 can include a color and/or pattern combination to organize or assist in defining the type of action or step being instructed by the node wisdom 926. The display region 922 provides visual content that is to be displayed by the interactive multimedia process flow chart analysis tool 118 of FIG. 1, e.g., visible portions of nodes 320 of FIG. 3. The node wisdom 926 is the main text depicted in a node 920, which may provide an instruction, process step or decision criteria for display by both the interactive multimedia process flow chart analysis tool 118 and the interactive multimedia process flow chart builder tool 119 of FIG. 1, e.g., "LP Symbol Displayed" in both node 320a of FIG. 3 and node 920a of FIG. 10. In contrast, the editing command region 924 is only for creating and editing a process flow chart, such as the process flow chart 902, and may not be depicted or modified via the interactive multimedia process flow chart analysis tool 118 of FIG. 1.

The editing command region 924 depicts at least one node editing command 927. In the example of FIG. 11, the editing command region 924 includes a node delete command 930 and a node information panel command 932 as node editing commands 927. Including the node delete command 930 on each of the nodes 920 enables rapid removal of any selected node. For example, where node 920a is the selected node for deletion, the interactive multimedia process flow chart builder tool 119 of FIG. 1 removes the selected node from the process flow chart 902 based on detecting a user selection action of the node delete command 930 on the selected node. The node information panel command 932 is further described herein with respect to FIG. 12.

In FIG. 11, each node 920 includes a pair of output hubs 934 and 936. The output hubs 934, 936 are operable to link the nodes 920 with connections that define flow paths through the process flow chart 902. In the example of FIG. 11, output hub 934a has no connection and output hub 936a is linked to node 920b. Accordingly, node 920a of the process flow chart 902 is a process step node 940, since there is no decision to be made and at least one of the output hubs 934a, 936a is linked to a single node 920 defining a next process step, i.e., node 920b. Node 920b includes a pair of output hubs 934b and 936b, which have respective links to node 920d and 920c. Node 920b is an example of a decision node 942 of the process flow chart 902, where linking of the output hub 934b to node 920d defines a yes-path 935b and linking of the output hub 936b to node 920c defines a no-path 937b. Node 920c is an example of an end node 944 of the process flow chart 902 absent any output links from the end node 944, i.e., no links are defined from output hubs 934c and 936c of node 920c.

As can be seen in the example of FIG. 11, the decision node 942, the process step node 940, and the end node 944 each have a common shape including a display region 922 illustrating node information 923 and an editing command region 924 depicting at least one node editing command 927. The common shape can ease editing and reconfiguration of the process flow chart 902, avoiding a time consuming selection from numerous possible shapes for each node. The links from output hubs 934 and 936 can be used to define a node type. The output hubs 934 and 936 need not be depicted when the process flow chart 902 is loaded for use by the interactive multimedia process flow chart analysis tool 118 of FIG. 1, see for example, process flow chart 302 of FIG. 3. Connections from the output hubs 934 and 936 can be used by the interactive multimedia process flow chart analysis tool 118 of FIG. 1 to select decision options for display, such as decision options 404 and 504 of FIGS. 4 and 5.

Figure 12:
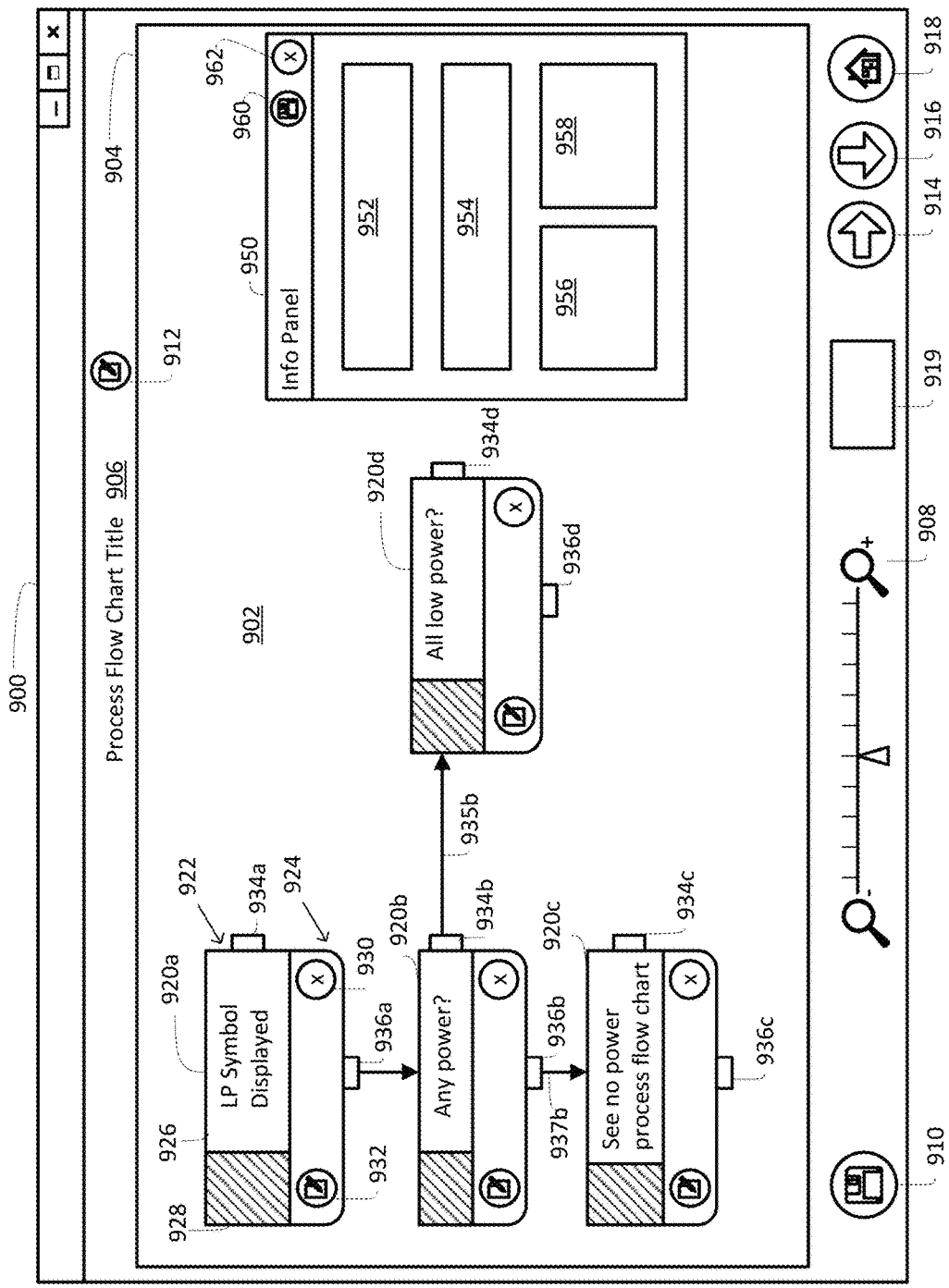
FIG. 12 illustrates an example of a node information panel for the process flow chart under development in the user interface of FIG. 10.

In order to reconfigure the content of each node 920, a respective instance of the node information panel command 932 can be selected from each node 920. FIG. 12 illustrates an example of a node information panel 950 for the process flow chart 902 under development in the user interface 900 of the interactive multimedia process flow chart builder tool 119 of FIG. 1. The node information panel 950 of FIG. 12 is opened based on detecting a user selection action of the node information panel command 932 for a selected node, such as node 920a. The node information panel 950 can include a node wisdom section 952, an additional information section 954, a supplemental content section 956, a node category section 958, a save command 960, and a close command 962. Assuming that node 920a is the selected node, the node wisdom 926 of the selected node corresponds to the node wisdom section 952 and the node category 928 corresponds to the node category section 958 of the node information panel 950. The node wisdom 926 of the selected node is updated based on detecting a user selected change to the node wisdom section 952 on the node information panel 950. The node wisdom section 952 is an editable text box that enables entry and/or changes to the node wisdom 926, e.g., creation or editing of text "LP Symbol Displayed" in node 920a. The node category 928 of the selected node is updated based on detecting a user selected change to the node category section 958 on the node information panel 950. Node category titles are also editable by the user, for instance, through double-clicking on them.

Additional information, such as additional information 600 of FIG. 6, can be established to display for the selected node based on user input, including hyperlinks, to the additional information section 954 of the node information panel 950. Supplemental content for the selected node can be set based on user input to the supplemental content section 956 of the node information panel 950. The supplemental content can include one or more of: an image, a video, or an audio clip. Supplemental content can be stored locally in the data storage system 112, in memory 114, or remotely in remote data 132 of FIG. 1. Supplemental content from the supplemental content section 956 of FIG. 12 may be displayed, played, or linked as part of the additional information 600 of FIG. 6.

Figure 13:
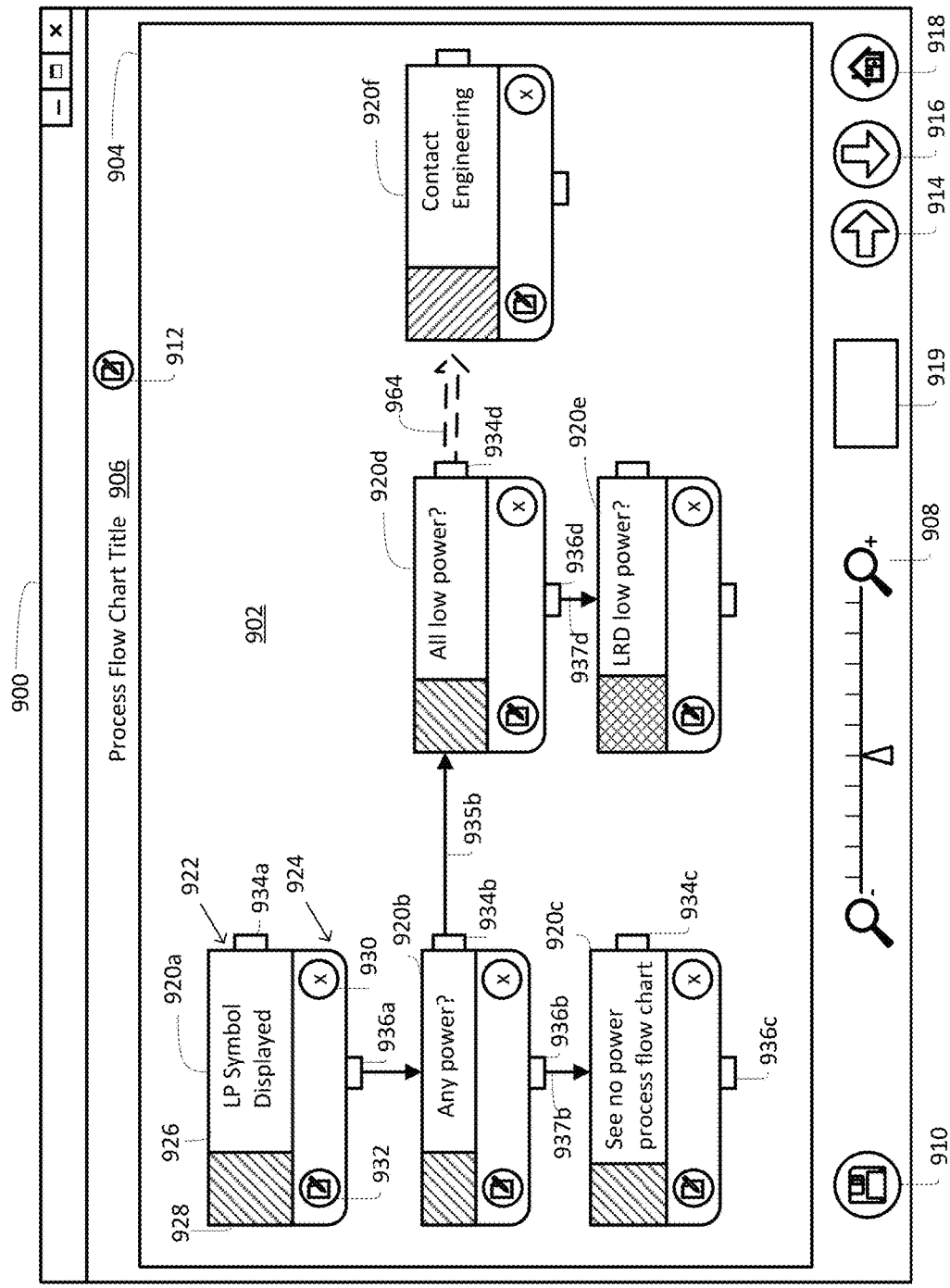
FIG. 13 illustrates an example of adding nodes to the process flow chart under development in the user interface of FIG. 10.

As previously described, the user interface 900 provides a number of options for adding nodes 920 to the process flow chart 902. FIG. 13 illustrates an example of adding nodes 920 to the process flow chart 902 under development in the user interface 900 of the interactive multimedia process flow chart builder tool 119 of FIG. 1. In FIG. 13, node 920d is in the process of being configured as a decision node. Node 920f can be added to the right of node 920d using, for instance, the new node command icon 919 or the insert column at end command 914. The output hubs 934 and 936 can also be used by double-clicking to add a node 920 with a link. Output hub 934 may also be referred to as a yes-path hub for forming a yes-path, and output hub 936 may be referred to as a no-path hub for forming a no-path. Accordingly, output hub 934b is yes-path hub for yes-path 935b, and output hub 936b is a no-path hub for no-path 937b. In the example of FIG. 13, upon detecting a user-selection action, such as a double click, at output hub 936d (no-path hub), node 920e is added as a no-path node at a next greater row location relative to the location of node 920d. As part of the same response to detecting the user-selection action, a connection is created between the no-path hub 936d and the no-path node (node 920e) as a no-path 937d.

Figure 14:
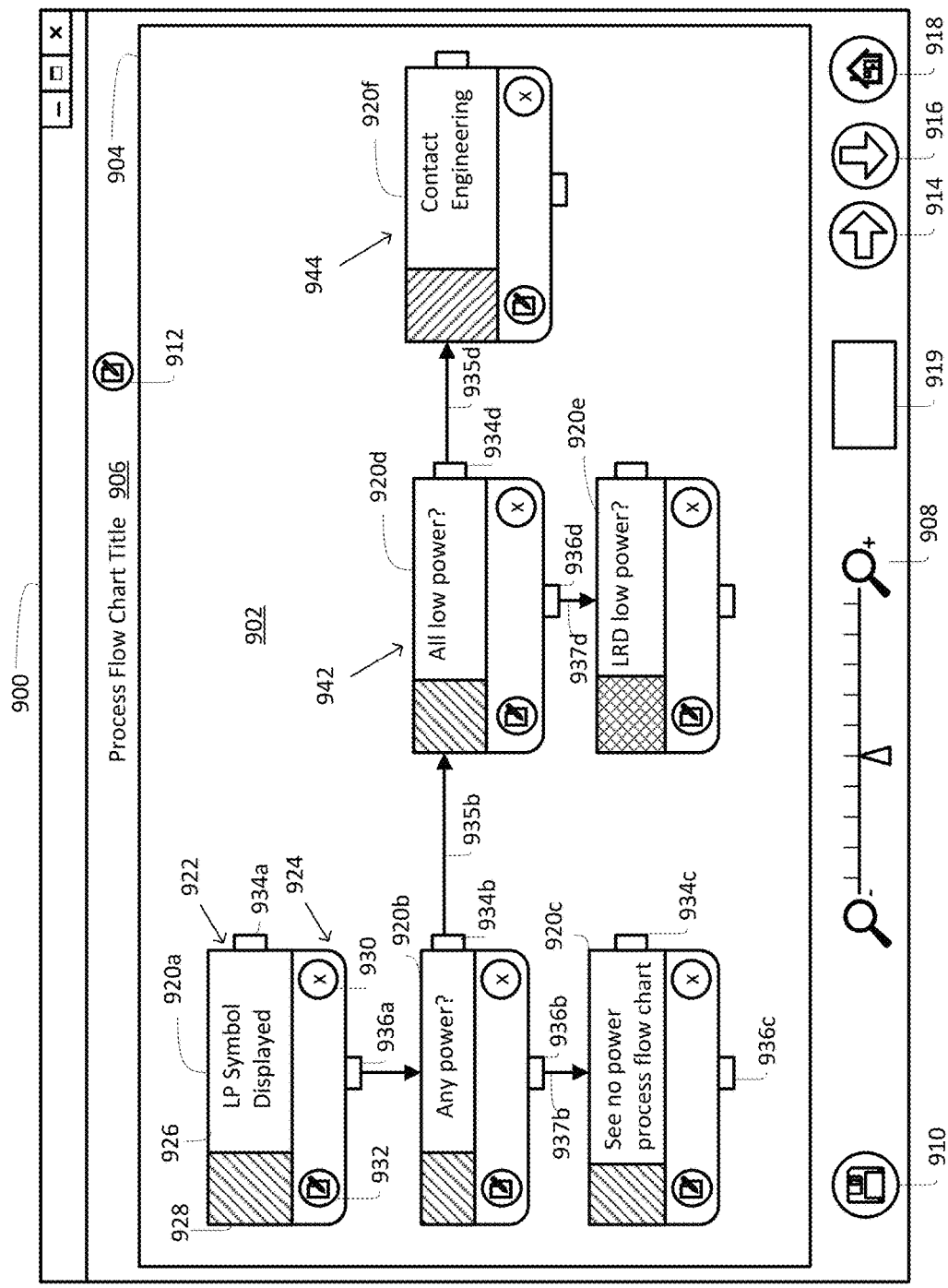
FIG. 14 illustrates an example of adding a connection to the process flow chart under development in the user interface of FIG. 10.

If there is not a node 920 to the right of output hub 934d (yes-path hub) of node 920d, then upon detecting a user-selection action at output hub 934d (yes-path hub), a yes-path node would be added at a next greater column location relative to a location of node 920d, and a connection between the yes-path hub 934d and the yes-path node would be created as a yes-path. However, once the node 920f has been added, a user-selection action such as a double click on the yes-path hub 934d will not be successful since the next greater column location relative to the location of node 920d is occupied by node 920E A connection can be added between nodes 920d and 920f based on detecting a user-initiated dragging motion 964 from the output hub 934d of node 920d as a first node to node 920f as a second node. FIG. 14 illustrates an example of adding a connection to the process flow chart 902 under development in the user interface 900 of the interactive multimedia process flow chart builder tool 119 of FIG. 1 as yes-path 935d based on the completing the dragging motion 964 of FIG. 13. Accordingly, as can be seen in FIG. 14, node 920d is another example of a decision node 942 and node 920f is another example of an end node 944.

Although the examples of FIGS. 11-14 depict output hubs 934 and 936 in a consistent position in all of the nodes 920, i.e., output hub 934 on a right side and output hub 936 on a bottom side, the output hubs 934 and 936 need not be limited to these locations. For example, the nodes 920 may be collectively or individually configurable to place output hubs 934 and 936 on any side of each node 920. Additionally, the output hubs 934 and 936 can default to different positions on each node 920 than as depicted in FIGS. 11-14.

Figure 15:
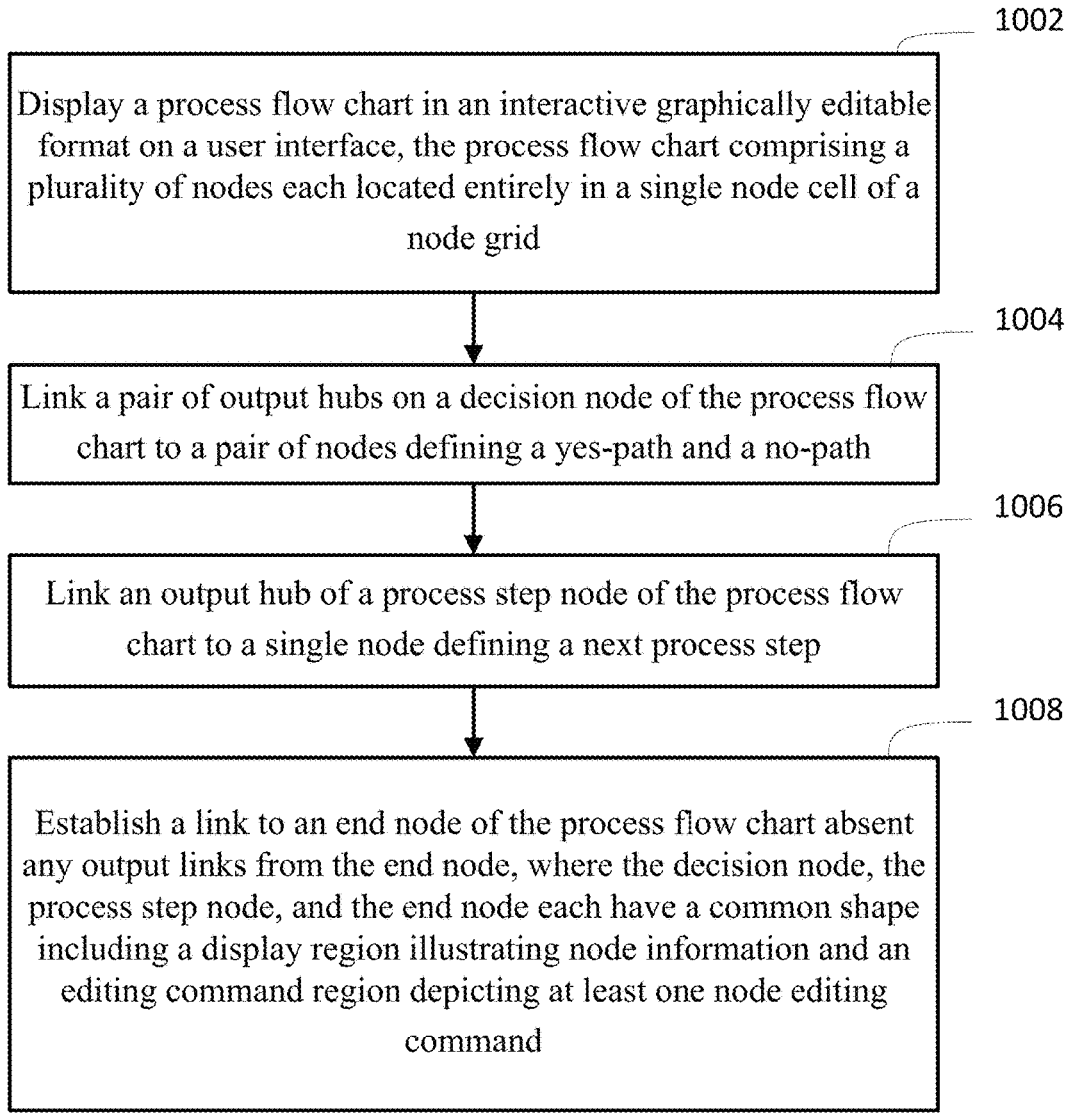
FIG. 15 illustrates an exemplary process for building an interactive multimedia process flow chart.

FIG. 15 illustrates an exemplary process 1000 for building an interactive multimedia process flow chart. The process 1000 can be implemented in the system 100 of FIG. 1. The process 1000 is described in reference to FIGS. 1-15, and may be performed by the interactive multimedia process flow chart system 102 and/or in combination with one or more of the client systems 104. In an exemplary embodiment, the interactive multimedia process flow chart builder tool 119 performs the process 1000 in conjunction with one of the client interfaces 134. The interactive multimedia process flow chart builder tool 119 configures the processing circuitry 116 to perform the process 1000. The process 1000 can be applied for creating or editing any of the process flow charts 124 but is described in reference to the process flow chart 902 of FIGS. 11-14 for purposes of explanation.

At block 1002, a process flow chart 902 or a blank stage for creating a new process flow chart, depending on user selection on the main menu page 252, is displayed in an interactive graphically editable format on a user interface 900. The process flow chart 902 includes a plurality of nodes 920 each located entirely in a single node cell 907 of a node grid 901. The node grid 901 includes a plurality of node cells 907 each defined by a row location and a column location for any number of rows 903 and columns 905.

At block 1004, a pair of output hubs 934, 936 on a decision node 942 of the process flow chart 902 is linked to a pair of nodes 920 defining a yes-path 935 and a no-path 937. A yes-path node, such as node 920d, can be added at a next greater column location relative to a location of the decision node 942, such as node 920b, based on detecting a user selection action at a yes-path hub 934b of the pair of output hubs 934b, 936b. A connection is created between the yes-path hub 934b and the yes-path node (node 920d) as the yes-path 935b based on detecting the user selection action at the yes-path hub 934b. A no-path node, such as node 920c, can be added at a next greater row location relative to the location of the decision node 942 (node 920b) based on detecting a user selection action at a no-path hub 936b of the pair of output hubs 934b, 936b. A connection is created between the no-path hub 936b and the no-path node (node 920c) as the no-path 937b based on detecting the user selection action at the no-path hub 936b.

At block 1006, an output hub 934 or 936 of a process step node 940, such as output hub 936a of node 920a, of the process flow chart 902 is linked to a single node 920, such as node 920b, defining a next process step.

At block 1008, a link is established to an end node 944, such as no-path 937b to node 920c, of the process flow chart 902 absent any output links from the end node 944. The decision node 942, the process step node 940, and the end node 944 each have a common shape including a display region 922 illustrating node information 923 and an editing command region 924 depicting at least one node editing command 927. The node information 923 may include a node category 928 indicating a type of action associated with each node 920, and node wisdom 926 defining a process step or decision to display for each node 920.

The at least one node editing command 927 can include a node information panel command 932 and a node delete command 930. A node information panel 950 is opened based on detecting a user selection action of the node information panel command 932 for a selected node 920, such as node 920a. The node category 928 of the selected node 920 is updated based on detecting a user selected change to the node category section 958 on the node information panel 950. The node wisdom 926 of the selected node 920 is updated based on detecting a user selected change to the node wisdom section 952 on the node information panel 950. The node category titles may be editable by the user through double-clicking them. The node information panel 950 can further include an additional information section 954 and a supplemental content section 956. Additional information to display, including hyperlinks, for the selected node 920 is established based on user input to the additional information section 954 of the node information panel 950. Supplemental content for the selected node 920 is selected based on user input to the supplemental content section 956 of the node information panel 950. The supplemental content can include one or more of: an image, a video, or an audio clip.

A number of possibilities exist for adding nodes 920 to the process flow chart 902. For example, a new node 920 can be added to the process flow chart 902 in a node cell 907 at a column location adjacent a right-most populated column based on detecting a user selection of an insert column at end command 914. A new node 920 can be added to the process flow chart 902 in a node cell 907 at a row location adjacent a bottom-most populated row based on detecting a user selection of an insert row at bottom command 916. A new node 920 may also be added to the process flow chart 902 in an unpopulated node cell 907 based on detecting a user-initiated dragging motion 925 from a new node command icon 919. Location-based editing commands may be provided through a pop-up menu. For example, a menu 917 may be opened at a user-selected location enabling a plurality of commands to reposition one or more nodes 920 of the process flow chart 902 based on the user-selected location. The plurality of commands enabled by the menu 917 can include: a column insertion command, a column deletion command, a row insertion command, a row deletion command, and a node movement command.

When editing a process flow chart 902, a connection can be added between two nodes 920 based on detecting a user-initiated dragging motion 964 from an output hub of a first node to a second node, such as output hub 934d of node 920d to node 920E The connection between the two nodes 920 may be removed based on detecting a user-initiated click action on the connection. The process flow chart 902 can be saved to a data storage system 112 in a markup language file format, such as XML, readable by an interactive multimedia process flow chart analysis tool 118 based on detecting a user selected save command, e.g., save session control 910.

The technical effects and benefits of the embodiments described herein provide interactive multimedia process flow chart building and analysis using interactive process flow charts. An interactive multimedia process flow chart builder tool can create and/or edit process flow charts. An interactive multimedia process flow chart analysis tool can provide guidance through a process flow chart, log progress in real-time, provide step specific feedback, save and restore sessions, categorize steps and decisions, and support process flow chart updates.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for building an interactive multimedia process flow chart, the method comprising:
    outputting a process flow chart in an interactive graphically editable format on a user interface by an interactive multimedia process flow chart builder tool executable on a processing subsystem of an interactive multimedia process flow chart system, the process flow chart comprising a plurality of nodes each located entirely in a single node cell of a node grid, wherein the user interface is interactively displayed on a first client interface of a first client system configured to communicate with the interactive multimedia process flow chart system across a network;
    linking, by the interactive multimedia process flow chart builder tool responsive to user input from the first client interface, a pair of output hubs on a decision node of the process flow chart to a pair of nodes defining a yes-path and a no-path to form a troubleshooting tree;
    linking, by the interactive multimedia process flow chart builder tool responsive to user input from the first client interface, an output hub of a process step node of the process flow chart to a single node defining a next process step in the troubleshooting tree;
    establishing, by the interactive multimedia process flow chart builder tool responsive to user input from the first client interface, a link to an end node of the process flow chart absent any output links from the end node in the troubleshooting tree, wherein the decision node, the process step node, and the end node all have a same common shape including a display region illustrating node information and an editing command region depicting at least one node editing command;
    saving the process flow chart to a data storage system of the interactive multimedia process flow chart system;
    reading the process flow chart from the data storage system by an interactive multimedia process flow chart analysis tool executable on the processing subsystem of the interactive multimedia process flow chart system, wherein the reading is performed responsive to a second client interface of a second client system configured to communicate with the interactive multimedia process flow chart system across the network; and
    executing a troubleshooting process, by the interactive multimedia process flow chart analysis tool responsive to user input from the second client interface, based on the process flow chart to control traversal through a sequence of troubleshooting steps comprising the plurality of nodes and a plurality of paths to identify a root cause and an associated remedy, wherein the interactive multimedia process flow chart analysis tool prevents access to the at least one node editing command that is accessible during execution of the interactive multimedia process flow chart builder tool.

2. The method of claim 1, wherein the node grid comprises a plurality of node cells each defined by a row location and a column location, the method further comprising:
    adding a yes-path node at the next greater column location relative to a location of the decision node based on detecting a user selection action at a yes-path hub of the pair of output hubs; and
    adding a no-path node at the next greater row location relative to the location of the decision node based on detecting a user selection action at a no-path hub of the pair of output hubs.

3. The method of claim 2, wherein the linking of the pair of output hubs on the decision node of the process flow chart to the pair of nodes defining the yes-path and the no-path further comprises:
    creating a connection between the yes-path hub and the yes-path node as the yes-path based on detecting the user selection action at the yes-path hub; and
    creating a connection between the no-path hub and the no-path node as the no-path based on detecting the user selection action at the no-path hub.

4. The method of claim 1, wherein the node information further comprises a node category indicating a type of action associated with each node, and node wisdom defining a process step or decision to display for each node.

5. The method of claim 4, wherein the at least one node editing command comprises a node information panel command depicted as an icon in the editing command region, the method further comprising:
    opening a node information panel based on detecting a user selection action of the node information panel command for a selected node;
    updating the node category of the selected node based on detecting a user selected change to a node category section on the node information panel; and
    updating the node wisdom of the selected node based on detecting a user selected change to a node wisdom section on the node information panel.

6. The method of claim 5, wherein the node information panel further comprises an additional information section and a supplemental content section, the method further comprising:
    establishing additional information to display, including hyperlinks, for the selected node based on user input to the additional information section of the node information panel; and
    setting supplemental content for the selected node based on user input to the supplemental content section of the node information panel, the supplemental content comprising one or more of: an image, a video, or an audio clip.

7. The method of claim 1, wherein the at least one node editing command comprises a node delete command depicted as an icon in the editing command region, the method further comprising:
    removing a selected node from the process flow chart based on detecting a user selection action of the node delete command on the selected node.

8. The method of claim 1, further comprising:
    adding a connection between two nodes based on detecting a user-initiated dragging motion from an output hub of a first node to a second node; and
    removing the connection between the two nodes based on detecting a user-initiated click action on the connection.

9. The method of claim 1, wherein the node grid comprises a plurality of node cells each defined by a row location and a column location, the method further comprising:
adding a new node to the process flow chart in a node cell at a column location adjacent a right-most populated column based on detecting a user selection of an insert column at end command;
adding a new node to the process flow chart in a node cell at a row location adjacent a bottom-most populated row based on detecting a user selection of an insert row at bottom command; and
adding a new node to the process flow chart in an unpopulated node cell based on detecting a user-initiated dragging motion from a new node command icon.

10. The method of claim 1, further comprising:
opening a menu at a user-selected location enabling a plurality of commands to reposition one or more nodes of the process flow chart based on the user-selected location, the plurality of commands comprising: a column insertion command, a column deletion command, a row insertion command, a row deletion command, and a node movement command.

11. The method of claim 1, wherein
the process flow chart is saved to the data storage system in a markup language file format readable by the interactive multimedia process flow chart analysis tool based on detecting a user selected save command.

12. An interactive multimedia process flow chart system, comprising:
a data storage system;
a memory comprising an interactive multimedia process flow chart builder tool and an interactive multimedia process flow chart analysis tool; and
processing circuitry coupled to the memory, the interactive multimedia process flow chart builder tool executable by the processing circuitry to:
output a process flow chart in an interactive graphically editable format on a user interface, the process flow chart comprising a plurality of nodes each located entirely in a single node cell of a node grid, wherein the user interface is interactively displayed on a first client interface of a first client system configured to communicate with the interactive multimedia process flow chart system across a network;
link, responsive to user input from the first client interface, a pair of output hubs on a decision node of the process flow chart to a pair of nodes defining a yes-path and a no-path to form a troubleshooting tree;
link, responsive to user input from the first client interface, an output hub of a process step node of the process flow chart to a single node defining a next process step in the troubleshooting tree;
establish, responsive to user input from the first client interface, a link to an end node of the process flow chart absent any output links from the end node in the troubleshooting tree, wherein the decision node, the process step node, and the end node all have a same common shape including a display region illustrating node information and an editing command region depicting at least one node editing command; and
save the process flow chart to the data storage system;
wherein the interactive multimedia process flow chart analysis tool is executable by the processing circuitry to:
read the process flow chart from the data storage system responsive to a second client interface of a second client system configured to communicate with the interactive multimedia process flow chart system across the network; and
execute a troubleshooting process responsive to user input from the second client interface based on the process flow chart to control traversal through a sequence of troubleshooting steps comprising the plurality of nodes and a plurality of paths to identify a root cause and an associated remedy, wherein the interactive multimedia process flow chart analysis tool prevents access to the at least one node editing command that is accessible during execution of the interactive multimedia process flow chart builder tool.

13. The interactive multimedia process flow chart system of claim 12, wherein the node grid comprises a plurality of node cells each defined by a row location and a column location, the interactive multimedia process flow chart builder tool further executable by the processing circuitry to:
add a yes-path node at the next greater column location relative to a location of the decision node based on detecting a user selection action at a yes-path hub of the pair of output hubs;
create a connection between the yes-path hub and the yes-path node as the yes-path based on detecting the user selection action at the yes-path hub;
add a no-path node at the next greater row location relative to the location of the decision node based on detecting a user selection action at a no-path hub of the pair of output hubs; and
create a connection between the no-path hub and the no-path node as the no-path based on detecting the user selection action at the no-path hub.

14. The interactive multimedia process flow chart system of claim 12, wherein the node information further comprises a node category indicating a type of action associated with each node, and node wisdom defining a process step or decision to display for each node.

15. The interactive multimedia process flow chart system of claim 14, wherein the at least one node editing command comprises a node information panel command depicted as an icon in the editing command region, the interactive multimedia process flow chart builder tool further executable by the processing circuitry to:
open a node information panel based on detecting a user selection action of the node information panel command for a selected node;
update the node category of the selected node based on detecting a user selected change to a node category section on the node information panel; and
update the node wisdom of the selected node based on detecting a user selected change to a node wisdom section on the node information panel.

16. The interactive multimedia process flow chart system of claim 15, wherein the node information panel further comprises an additional information section and a supplemental content section, the interactive multimedia process flow chart builder tool further executable by the processing circuitry to:
establish additional information to display, including hyperlinks, for the selected node based on user input to the additional information section of the node information panel; and
set supplemental content for the selected node based on user input to the supplemental content section of the node information panel, the supplemental content comprising one or more of: an image, a video, or an audio clip.

17. The interactive multimedia process flow chart system of claim 12, wherein the interactive multimedia process flow chart builder tool is further executable by the processing circuitry to:

add a connection between two nodes based on detecting a user-initiated dragging motion from an output hub of a first node to a second node; and remove the connection between the two nodes based on detecting a user-initiated click action on the connection.

18. The interactive multimedia process flow chart system of claim 12, wherein the node grid comprises a plurality of node cells each defined by a row location and a column location, the interactive multimedia process flow chart builder tool further executable by the processing circuitry to:

add a new node to the process flow chart in a node cell at a column location adjacent a right-most populated column based on detecting a user selection of an insert column at end command;

add a new node to the process flow chart in a node cell at a row location adjacent a bottom-most populated row based on detecting a user selection of an insert row at bottom command; and add a new node to the process flow chart in an unpopulated node cell based on detecting a user-initiated dragging motion from a new node command icon.

19. The interactive multimedia process flow chart system of claim 12, wherein the interactive multimedia process flow chart builder tool is further executable by the processing circuitry to:

open a menu at a user-selected location enabling a plurality of commands to reposition one or more nodes of the process flow chart based on the user-selected location, the plurality of commands comprising: a column insertion command, a column deletion command, a row insertion command, a row deletion command, and a node movement command.

20. The interactive multimedia process flow chart system of claim 12, wherein the process flow chart is saved to the data storage system in a markup language file format readable by the interactive multimedia process flow chart analysis tool based on detecting a user selected save command.

* * * * *